United States Patent [19]

Yuyama et al.

[11] Patent Number: 4,704,627

[45] Date of Patent: Nov. 3, 1987

[54] STEREOSCOPIC TELEVISION PICTURE TRANSMISSION SYSTEM

[75] Inventors: Ichiro Yuyama; Mitsuho Yamada; Haruo Isono; Minoru Yasuda, all of Tokyo, Japan

[73] Assignee: Nippon Hoso Kyokai, Tokyo, Japan

[21] Appl. No.: 939,430

[22] PCT Filed: Dec. 17, 1985

[86] PCT No.: PCT/JP85/00690

§ 371 Date: Aug. 8, 1986

§ 102(e) Date: Aug. 8, 1986

[87] PCT Pub. No.: WO86/03924

PCT Pub. Date: Jul. 3, 1986

[30] Foreign Application Priority Data

Dec. 17, 1984 [JP] Japan .................. 59-265798
Mar. 11, 1985 [JP] Japan .................. 60-46402

[51] Int. Cl.⁴ .............. H04N 13/00; H04N 13/02; H04N 13/04; H04N 15/00
[52] U.S. Cl. .................. 358/88; 358/3; 358/92; 358/136
[58] Field of Search .............. 358/3, 88, 92, 136

[56] References Cited

U.S. PATENT DOCUMENTS 4,541,007  9/1985  Nagata .................. 358/3
4,625,290 11/1986  White .................. 358/88
4,647,965  3/1987  Imsand .................. 358/88
4,656,511  4/1987  Koga .................. 358/136

FOREIGN PATENT DOCUMENTS 54-111371  8/1979  Japan .
57-92989   6/1982  Japan .

*Primary Examiner*—Howard W. Britton
*Attorney, Agent, or Firm*—Spencer & Frank

[57] ABSTRACT

Each of left and right images of a stereoscopic television picture is divided into a plurality of blocks and a position of one of the images is shifted in such a way that a difference between one picture signal ($S_L$) in one block of one of the left and right images and the other picture signal ($S_R$) in a block corresponding in position to the one block is minimized, to obtain a positional shift (p,q) between one picture and the other picture. A difference signal (S3) between one picture signal (S2) shifted by the positional shift (p,q) and the other picture signal ($S_R$) is obtained in each block. The difference signal (S3) is compressed into a data compressed difference signal (S4). The compressed difference signal (S4), one video signal ($S_L$) and the signal (S1) representative of the positional shift (p,q) are transmitted so that an amount of signals to be transmitted can be remarkably reduced. In addition, a transmission bandwidth can be further compressed by obtaining the difference signal only with respect to an object loaded at a short distance from the television cameras and concentrated in the center portion of the picture.

18 Claims, 43 Drawing Figures

FIG. 4A  FIG. 4B
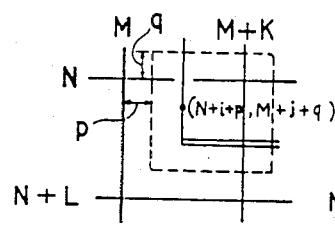
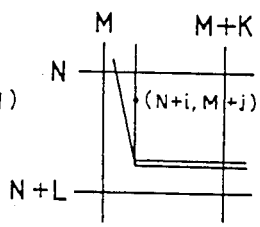
FIG. 4C  FIG. 4D
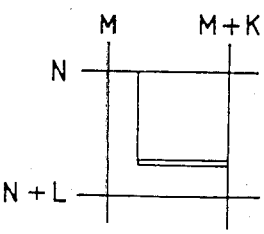
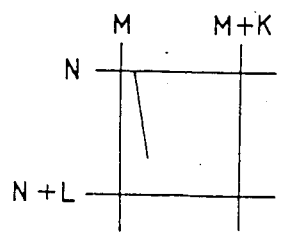
FIG. 8
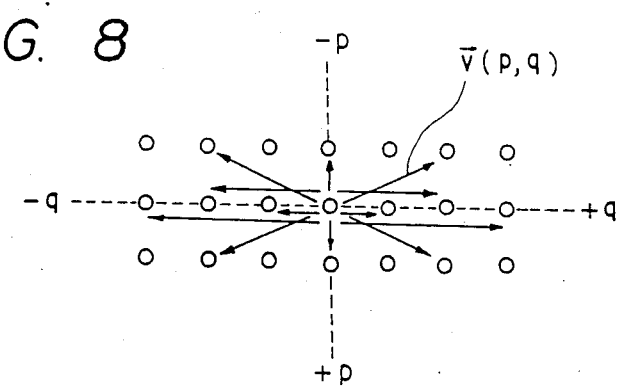

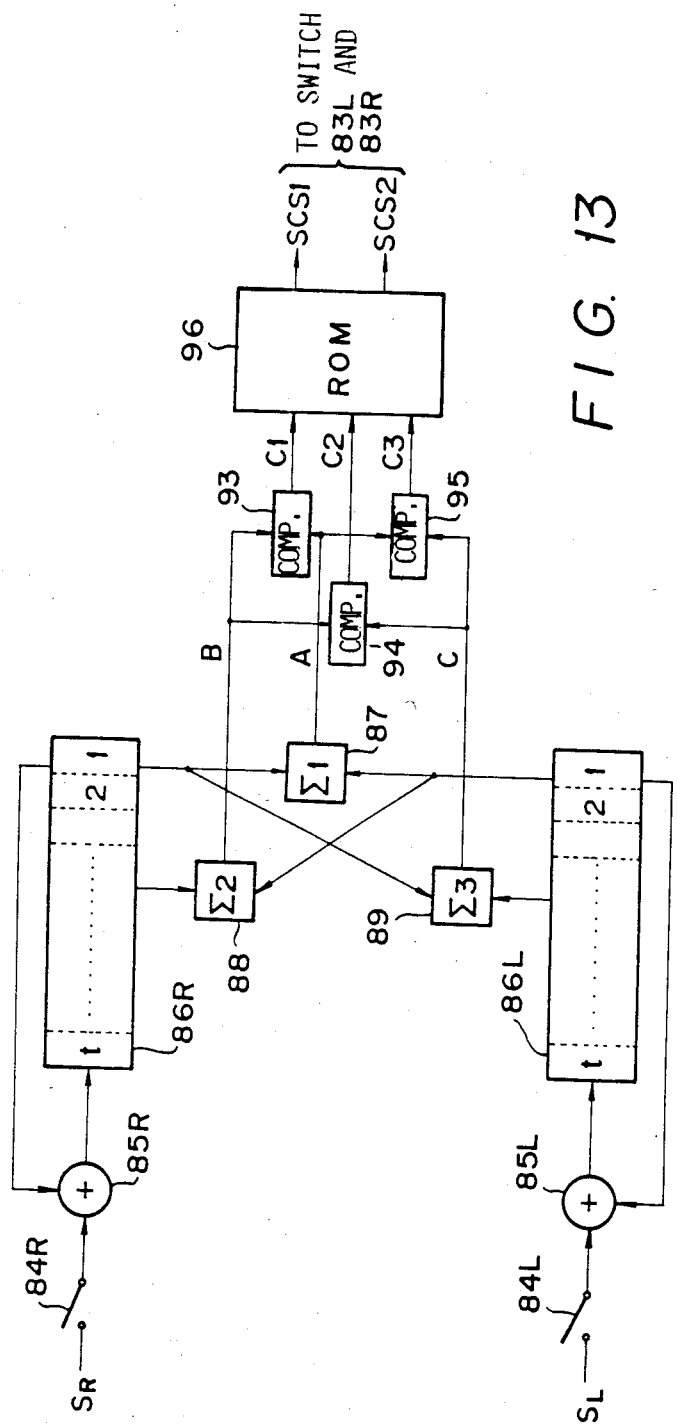
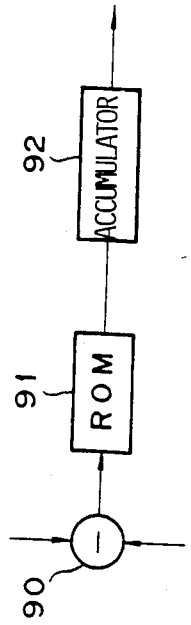
FIG. 13
FIG. 14

| C1 | 0 | 0 | 0 | 0 | 1 | 1 | 1 | 1 |
|---|---|---|---|---|---|---|---|---|
| C2 | 0 | 0 | 1 | 1 | 0 | 0 | 1 | 1 |
| C3 | 0 | 1 | 0 | 1 | 0 | 1 | 0 | 1 |
| A,B,C, GIVING MINIMUM VALUE | // | C | B | B | A | C | A | A |
| SCS1 | // | 0 | 1 | 1 | 0 | 0 | 0 | 0 |
| SCS2 | // | 1 | 0 | 0 | 0 | 1 | 0 | 0 |

(96)

FIG. 21A
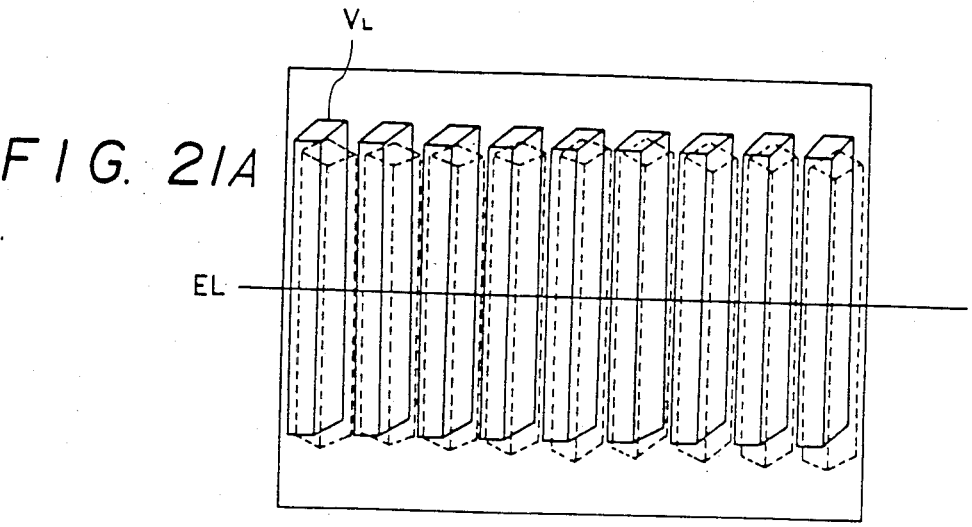
FIG. 21B
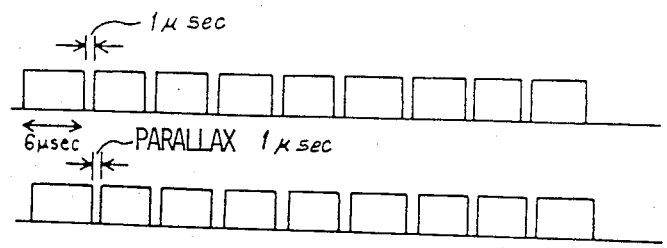
FIG. 21C
FIG. 21D
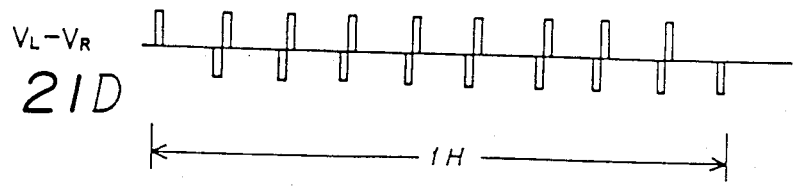

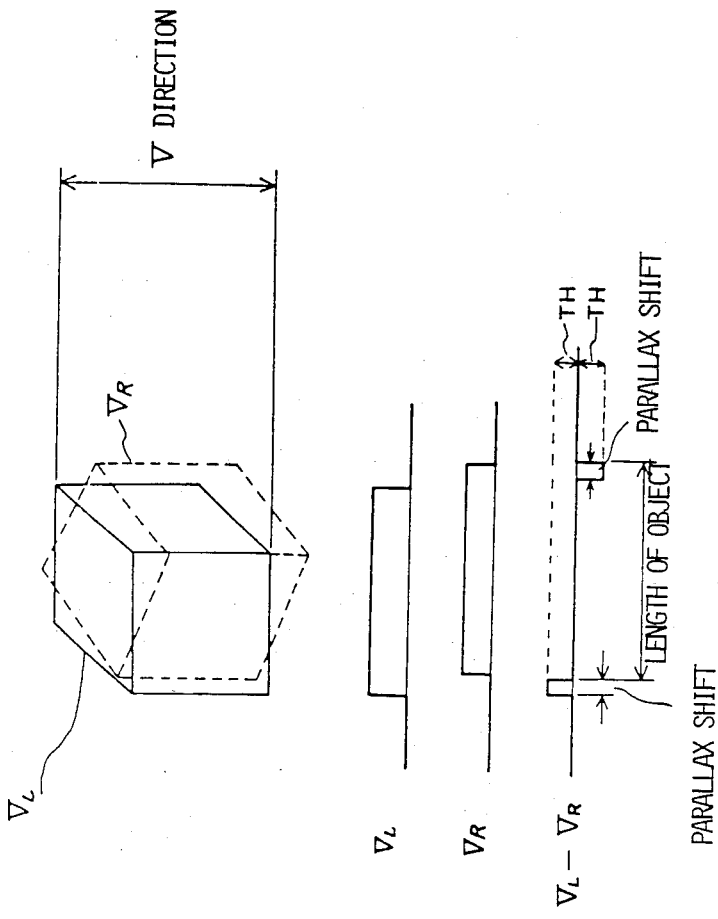

FIG. 24

| B1 | B2 | B3 | B4 |
|----|----|----|----|
| B5 | B6 | B7 | B8 |
| B9 | B10 | B11 | B12 |
| B13 | B14 | B15 | B16 |

FIG. 25

| B1 | B2 | B3 | B4 | B5 | B6 | B7 | B8 |
|----|----|----|----|----|----|----|----|
| B9 | B10 | B11 | B12 | B13 | B14 | B15 | B16 |
| B17 | B18 | B19 | B20 | B21 | B22 | B23 | B24 |
| B25 | B26 | B27 | B28 | B29 | B30 | B31 | B32 |

1 BLOCK

STEREOSCOPIC TELEVISION PICTURE TRANSMISSION SYSTEM

TECHNICAL FIELD

The present invention relates to a stereoscopic television video signal transmission system and more particularly to a stereoscopic or three-dimensional television video signal transmission system in which the bandwidth of two channel stereoscopic television signals corresponding to left and right eyes is compressed substantially to one channel television signal bandwidth, with considering visual characteristics of a human being.

BACKGROUND ART

When a three-dimensional image is produced, two video signals corresponding to left and right fields of a view of a human being are needed.

In order to reproduce a three-dimensional image, a synchronized recording and reproducing system capable in which two video signals are transmitted simultaneously and two video tape recorders (VTRs) are used has been so far used. According to this system, there arise various disadvantages. A first disadvantage is that a television signal transmission capacity must be doubled in comparison to a single transmission system. A second disadvantage is the increase in cost because two VTRs must be used. A third disadvantage is that precision circuits for correctly synchronizing two video signals and new transmission systems are required so that a delicate parallax is expressed.

In view of the above, there has been proposed a system in which information to be transmitted is suitably compressed by utilizing characteristics of a stereoscopic image.

For instance, Japanese Laid-open Patent Application No. 54-111371 filed by the same applicant discloses in a specification of "a distance measurement system" in which a suitable number of sampling points are selected on each line and it is assumed that a right picture is defined by a shift of a left picture so that an amount of the shift between the left and right pictures and the left picture are transmitted.

According to this system, the shift information must be transmitted for each line, so that the number of the shift information is increased as much as MN, where M is the number of sampling points on each line and N is the number of lines.

Furthermore, when a hexahedral object as shown in FIG. 1A is picked up by left and right television cameras, it is assumed that there exists a stereoscopic image having the left picture including the faces A, B and C and the right picture including the faces A, B and D are obtained. The face D is picked up by the right television camera so that it is contained in the right picture, but the left picture does not contain any information about the face D which is behind the scene in the left picture. As a result, even when the left image data (represented by dots) along the horizontal scanning line extended across the left picture as show in FIG. 1B is shifted rightward, it is impossible to obtain data corresponding to the face D in the right picture data. As a result, the reproduction of the right picture is not sufficient, so that unnatural pictures perceived by left and right eyes cause fatigue in the case of a long program.

In addition, according to this system, the left picture is shifted rightward to define the right picture from the left picture and thus in the case of a stereoscopic television system as shown in FIG. 2, of the left picture LCI picked up by a left camera LC and the right picture RCI picked up by a right camera RC, the left picture LCI is shifted rightward. In this case, it is possible to reproduce a right picture from the left picture picked up by the left camera LC for a rear object RO marked x at a longer distance from the left and right cameras LC and RC, but an object FO marked ● at a shorter distance from the left and right cameras LC and RC cannot be reproduced in the right picture from the left picture. As a result, it has been impossible to reproduce a three-dimensional image of an object moving forward or toward the left and right cameras LC and RC. Furthermore, according to this system, the right picture is reproduced by merely shifting the positions of the picture data on the horizontal lines in the left picture, so that a fine image is defined by a zig-zag line.

As described above, the prior art stereoscopic television picture transmission system has defects that its transmission band is unnecessarily broad because redundant information is transmitted and that required information is dropped because of unsatisfactory compression of information.

DISCLOSURE OF THE INVENTION

In view of the above, one of the objects of the present invention is to provide a stereoscopic television picture transmission system in which on a transmission side there is formed picture information required as minimum as possible from information of left and right pictures and then the minimal picture information is transmitted and or a receiving side a natural three-dimensional image is produced in accordance with the transmitted picture information.

Another object of the present invention is to provide a stereoscopic television picture transmission system in which both left and right pictures are divided into a plurality of blocks having an equal size; the left picture is shifted in each block so as to obtain a difference between the left and right pictures so that a deviation vector for minimizing the difference between the left and right pictures is obtained; the left picture is deviated by the vector thus obtained so as to derive a difference signal between the deviated left picture and the right picture; the difference signal thus obtained is compressed and then transmitted together with the deviation vector and the left video signal, so that an amount of data to be transmitted can be remarkably reduced.

Since the left and right eyes view the same object simultaneously, there is a considerably large correlation between the left and right pictures so that the same object can be viewed with a slight left and right parallax difference. Therefore, the left and right pictures become substantially the same even in case of a moving object and the difference signal between the left and right pictures (to be referred to as "a left-right difference signal" in this specification) represents a difference obtained by almost eliminating a slight left and right parallax difference. As a result, the left-right difference signal becomes almost zero in the most region. The present invention utilizes this fact, so that the data of the left and right pictures can be remarkably compressed.

A further object of the present invention is to provide a stereoscopic television picture transmission system in which the left-right difference signal; that is, the parallax signal can be further compressed on the basis of the visual characteristics of human being such as the viewpoint distribution obtained when a human being watches a television screen and the fact that the parallax between the left and right pictures appears only when an object at a short distance from the eyes is viewed and also on the basis of a characteristic of a three-dimensional image that an object at a short distance from the eyes or cameras is in the center portion of the picture frame.

A yet further object of the present invention is to provide a transmitter best adapted for use in the above-described stereoscopic television picture transmission system.

A still further object of the present invention is to provide a receiver best adapted for use in the above-described stereoscopic television picture transmission system.

In order to achieve these objects, in the first aspect of the present invention, a system for transmitting a stereoscopic television picture signal comprises:

means for dividing a first image and a second image of one frame of a stereoscopic television picture into a plurality of blocks;

means for shifting a position of one of the images to obtain an amount of a positional shift between the first and second images so that a difference between one picture signal of one of the first and second images for each block and the other picture signal of the other of the first and second images for a block located at a position corresponding to the each block on the picture;

means for shifting the one picture signal by the positional shift to produce a shift picture signal;

means for obtaining a difference signal between the shift picture signal and the other picture signal;

means for compressing data of the difference signal; and means for transmitting the data compressed difference signal, the one picture signal and a signal representative of the amount of the positional shift.

Here, a stereoscopic television picture signal transmission system may further comprise a first frame memory and a second frame memory for alternately storing the one picture signal at a unit of frame in each of the first and second frame memories;

a third frame memory and a fourth frame memory for alternately storing the other picture signal at a unit of frame in each of the third and fourth frame memories;

means for designating an address (N,M) representative of a predetermined line position N and a position M of a picture element on the predetermined line in each of the blocks of the one picture signal;

an address counter for generating address signals i and j;

stack means for storing therein a plurality of shift vector candidates (p,q);

means responsive to the N,i and p to produce line addresses (N+i+p) and (N+i) in the block;

means responsive to the M, j and q to produce picture element addresses (M+j+q) and (M+j);

means for obtaining as the difference signal a difference between data read out from the first or second frame memory in response to the addresses (N+i+p) and (M+j+q) and data read out from the third or fourth frame memory in response to the addresses (N+i) and (M+j);

means for obtaining an absolute value of the difference thus obtained;

means for obtaining a total sum of the absolute values of the differences in the block;

means for comparing the total sum at sequential addresses; and means responsive to the result of the comparison of the total sum for storing a value of (p,q) when a smaller total sum is obtained and for deriving as the positional shift a value of (p,q) when the minimum value of the total sum is obtained.

Furthermore, shift states of the first and second images can be determined at a plurality of corresponding positions of the first and second images of the one frame, and in response to the result of the determination thus made, the first and second images can be shifted so that the difference signal is produced and the positional shift is determined in each block.

Here, the first and second images can be left and right images of a stereoscopic picture. A stereoscopic picture can be composed of a plurality of images and sequentially adjacent images of the plurality of images can be designated as the first and second images. A stereoscopic picture can be composed of a plurality of images and a predetermined image of the plurality of images and one of the remaining images are designated as the first and second images.

In the second aspect of the present invention, a system for transmitting a stereoscopic television picture signal transmission system comprises:

means for dividing a portion in a periphery of each of left and right images of a stereoscopic television picture into relatively large-sized blocks and for dividing a portion in the center of each of the left and right images into relatively small-sized blocks;

means for detecting a parallax shift between an image of a block of one of the left and right images and an image of a block of the other image corresponding to the block of the one image, to obtain a parallax shift data;

means for shifting a parallax shift portion in the block of the one image in accordance with the parallax shift data, to generate a shift picture signal;

means for obtaining a difference signal between the shift picture signal and the other picture signal in a block of the other image corresponding to a block of the one image; and means for transmitting the one picture signal, the parallax shift signal and the difference signal in the block for each of the blocks.

Here, the one picture signal and the difference signal can be compressed in time axis and combined within one horizontal scanning period and the parallax shift data can be multiplexed in a vertical blanking period to transmit the one picture signal, the difference signal and the parallax shift signal in a signal bandwidth of one television channel.

Further, a size of division into the blocks can be made in inverse proportion to a view point distribution.

In the third aspect of the present invention, there is provided a receiver for a system for transmitting a stereoscopic television picture signal having:

means for dividing a first image and a second image of one frame of a stereoscopic television picture into a plurality of blocks;

means for shifting a position of one of the images to obtain an amount of a positional shift between the first and second images so that a difference between one picture signal of one of the first and second images for each block and the other picture signal of the other of the first and second images for a block located at a position corresponding to the each block on the picture;

means for shifting the one picture signal by the positional shift to produce a shift picture signal;

means for obtaining a difference signal between the shift picture signal and the other picture signal;

means for compressing data of the difference signal; and means for transmitting the data compressed difference signal, the one picture signal and a signal representative of the amount of the positional shift.

The receiver comprises:

means for receiving and separating the compressed difference signal; the one picture signal and the signal representative of the amount of the positional shift from each other;

means for decoding a difference signal from the compressed difference signal thus separated;

means for shifting one picture signal thus separated in response to the separated signal representative of the amount of the positional shift;

means for obtaining an addition signal of the one picture signal thus shifted and the decoded difference signal; and means for making the one picture signal thus separated as one reproduced picture signal and making the summation signal as other reproduced picture signal.

Here, a receiver may further comprise:

a fifth frame memory for storing therein the separated one picture signal;

means for delaying the separated difference signal by one frame;

means for designating an address (N,M) for indicating a predetermined line position N and a position M of a picture element on the predetermined line in each block of the one picture signal;

an address counter for generating address signals i and j;

means responsive to the N, i and p to produce line addresses (N+i+p) and (N+i) in the block;

means responsive to the M, j and q to produce picture element addresses (M+j+q) and (M+j) within the block;

means for producing an address (N+i+p, M+j+q) from the separated signal (p,q) representative of the amount of the positional shift and the (N,M) and (i,j);

means for deriving as a picture signal of the first image data read out from the fifth frame memory in response to the addresses (N+i+p) and (M+j+p);

means for adding the read out data to a difference signal delayed by one frame;

a sixth frame memory for storing therein an addition output from the adding means; and means for deriving as a picture signal of the second image data read out from the sixth frame memory in response to the addresses (N+i) and (M+j).

BRIEF DESCRIPTION OF THE DRAWINGS

FIGS. 4A-4D are diagrams showing a left picture, a right picture, a shifted left picture and a difference signal between the left and right pictures which are used to explain a procedure for producing the difference signal between the left and right pictures in the present invention;

FIG. 8 is an explanatory diagram used to explain thirteen kinds of vectors used for the detection of a shift vector;

FIGS. 12-14 are block diagrams showing another embodiment of the present invention;

FIGS. 21A-21D are explanatory diagrams used to explain actual left and right camera outputs and a parallax difference output;

FIGS. 22A-22D are explanatory diagrams used to explain a principle of detecting a positional shift caused by parallax;

FIG. 24 is a table diagram showing a positional shift detection blocks in the 525-line type television system;

FIG. 25 is a table diagram showing the positional shift detection blocks in the high definition television system;

BEST MODE FOR CARRYING OUT THE INVENTION

Figure 1A:
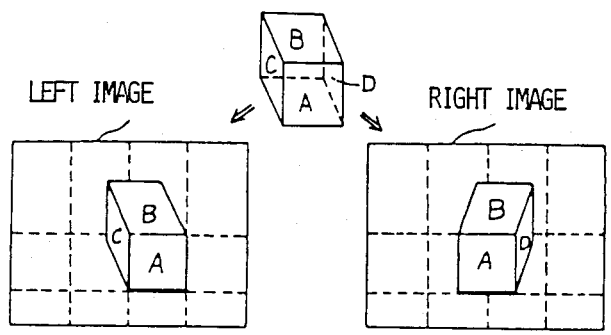
FIGS. 1A, 1B and 2 are explanatory diagrams used to explain problems encountered in a prior art stereoscopic television system.
Figure 1B:
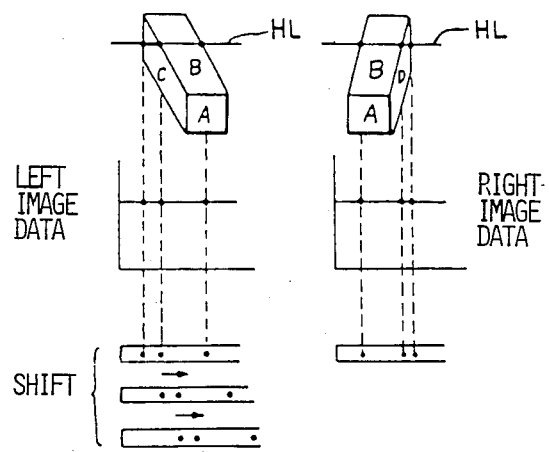
Figure 2:
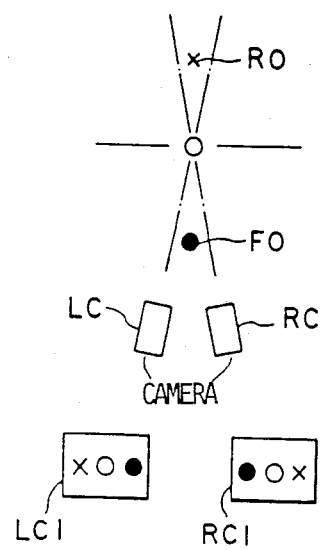

When an object is a hexahedron as shown in FIG. 1A, its left and right images are as shown in FIG. 1A. That is, a face A takes different positions between the left and right images. A face C appears in the left image, while the face C does not appear in the right image. A face D does not appear in the left image, while the face D appears in the right image. Amounts of shifts of the face B are different according to the place in the left and right images.

Figure 3:
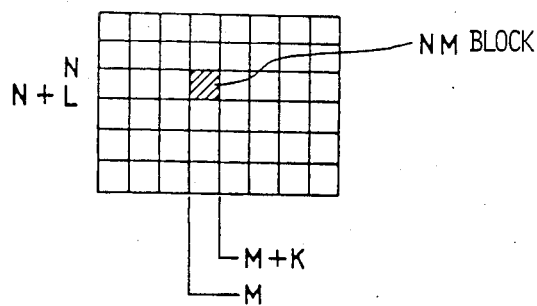
FIG. 3 is an explanatory diagram used to explain the division of a picture into blocks in accordance with the present invention.

In the present invention, when the outputs (left and right video signals) derived from the cameras corresponding to left and right eyes, respectively, are encoded, each image is divided into two-dimensional blocks as shown in FIG. 3, and a positional difference (deviation or shift) in each block between the left and right images are obtained and in response to the shift thus obtained, the left (or right) image is shifted. Subsequently, a difference signal between the shifted left (or right) image and the right (or left) image is obtained. The difference signal, the shift information and the left (or right) image information are transmitted together, so that a data amount required for transmission data can be reduced and the right (or left) image whose complete information is not transmitted can be reproduced on a receiver side completely.

In FIG. 3, it is assumed that the image is divided in the horizontal and vertical directions. Let us consider a hatched region (to be referred to as an NM block hereinafter) surrounded by horizontal lines N and N+L and vertical lines M and M+K.

FIGS. 4A and 4B show the left and right images, respectively, in this region. For instance, a method of minimizing a difference between the left and right images by shifting the left image or a method in which the left and right images are expanded into Fourier functions so that phase terms are obtained is employed to calculate how much the left image must be shifted in order that the left image becomes most similar to the right image. As a result, a shift (p, q) can be obtained as shown in FIG. 4A.

FIG. 4C shows a result that the left image as shown in FIG. 4A is shifted by an amount of the shift (p, q). By obtaining a difference between the shifted image as shown in FIG. 4C and the right image as shown in FIG. 4B, a left-right difference signal between the left and right image can be obtained as shown in FIG. 4D.

In practice, the left and right images are obtained by viewing the same object with a slight left-right difference. As described above, the left-right difference signal thus obtained represents a difference obtained after such left-right difference is substantially eliminated, so that such a left-right difference signal is substantially close to zero level in almost all the region Therefore, only a significant signal level is obtained in the portions corresponding to the planes C and D and at the joints of the blocks. With this in view, when such a left-right difference signal is encoded by a well known data compression method such as DPCM method or run-length encoding method, data can be considerably compressed.

On a receiver side, the left image signal (FIG. 4A) transmitted is shifted by a shift vector (p, q), so that the shifted left image as shown in FIG. 4C is obtained. Thereafter, the difference signal as shown in FIG. 4D is added to the shifted left image, so that the right image is reproduced as shown in FIG. 4B.

Figure 5:
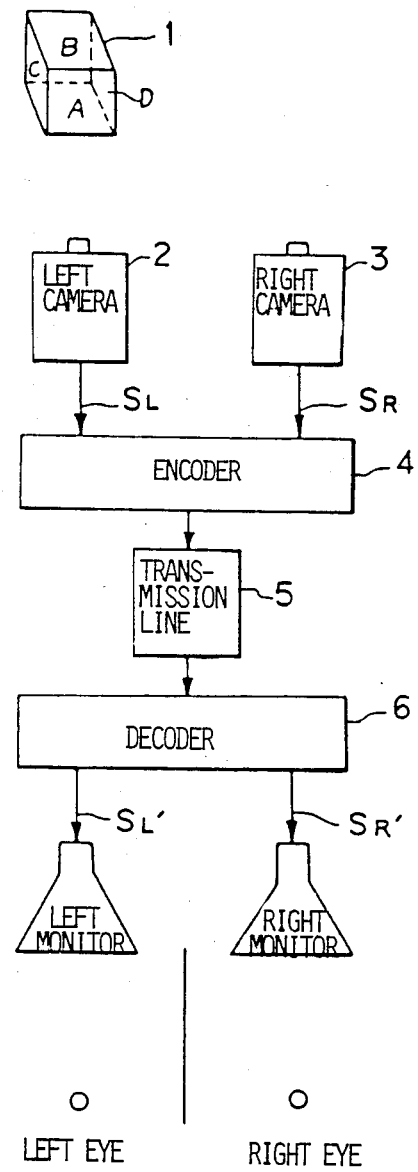
FIG. 5 is a schematic block diagram showing an underlying principle of a stereoscopic television picture transmission system in accordance with the present invention.
Figure 6:
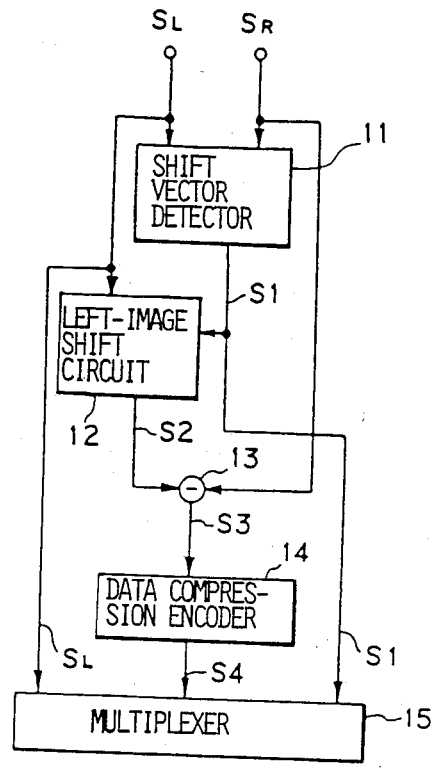
FIG. 6 is a block diagram showing an embodiment of the encoder shown in FIG. 5.
Figure 7:
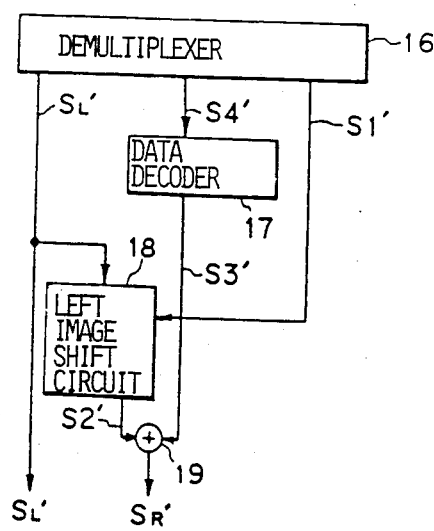
FIG. 7 is a block diagram showing an embodiment of the decoder as shown in FIG. 5.

Referring next to FIGS. 5, 6 and 7, a first embodiment of the present invention will be described in detail.

FIG. 5 is a schematic view showing a stereoscopic television image transmission system in accordance with the present invention. Left and right television cameras 2 and 3 obtain the left and right image signals $S_L$ and $S_R$ of a hexagon object 1, respectively. The left and right image signals $S_L$ and $S_R$ are in turn applied to an encoder 4 in which the signals $S_L$ and $S_R$ are encoded as will be described in more detail hereinafter The encoded signals are then transmitted through a transmission line 5 to a decoder 6 on the side of the receiver, so that the encoded signals are decoded to reproduce left and right video signals $S_L'$ and $S_R'$. The decoded signals $S_L'$ and $S_R'$ are displayed on left and right monitors 7 and 8, respectively. The monitors 7 and 8 are so adjusted their arrangement that the reproduced images are correctly projected to the left and right eyes through polarization filters.

FIG. 6 shows an embodiment of the encoder 4 as shown in FIG. 5, while 7 shows an embodiment of the decoder 6 as shown in FIG. 5.

Referring now to FIG. 6, the left and right video signals are applied to a shift vector detector 11 for detecting a vector shift in each block, so that the shift vector is detected in the manner described below.

It is assumed now that the NM block contains L horizontal lines in the vertical direction and K picture elements in the horizontal direction and that the upper left point of the NM block lies at the N-th line in the vertical direction and at the M-th picture element in the horizontal direction of the image.

As shown in FIG. 8, the types of shifts which the shift vector can take are limited to 13 types; that is, 13 shift types including two types of one-line shifts effected to the upper and lower horizontal lines; six types of shifts effected in the left and right directions by one, two and three picture elements; four types of shifts in the four oblique directions as shown in FIG. 8; and one type of non-shift. In FIG. 8, ○ represents a position of a picture element.

It is assumed that the shift vector be v (p, q). Then, the following equation is calculated in order to minimize a difference between the left and right image after the shift by the shift vector:

$$\underset{p,q}{Min} \sum_{i=0}^{K-1} \sum_{j=0}^{L-1} [|V_R(N+i, M+j) - V_L(N+i+p, M+j+q)|]$$

Here, $V_L(N+i+p, M+j+q)$ represents a signal obtained when the signal $V_L(N+i, M+j)$ at the j-th picture element on the i-th horizontal line in the NM block in which the first horizontal line in the vertical direction is the N-th line and the first picture element in the horizontal direction is the M-th picture element is shifted by (p, q) in accordance with the shift vector $\vec{v}(p, q)$ in the left image. In like manner, $V_R(N+i, M+j)$ represents a signal at the j-th picture element on the i-th horizontal line in the NM block of the right image.

Therefore, two frame memories are provided for each of the left and right images, so that the left and right video signals are sequentially written thereinto. The reading from the two frame memories are controlled in response to a read address. The sum of the absolute values of the differences in the left and right images is obtained at respective picture elements in one block to determine the minimum value for (p, q). (p, q) which gives the minimum sum is determined to be the shift vector $\vec{v}$(p, q).

For instance, in a high definition television system, assume that one picture consists of 1125 lines and 1440 picture elements. Then, the total number of blocks is given by $$(1125/L) \times (1440/K).$$

Assume here that L=11 and K=12. Then, the total number of blocks becomes 12,000. When the types of the shift vector is assumed to be 12 as shown in FIG. 8, then, $12 \times 11 = 132$ arithmetic operations are requried in one block, so that $12000 \times 132 \times 12$ (times) sum operations must be carried out in one frame. As a result, in the case of displaying a picture of 30 frames per second, a period of time assigned to one sum operation becomes $$33 \text{ (msec)} \div (12000 \times 132 \times 12) \simeq 1.8 \text{ (n sec)}.$$

Addition operation by an emitter-coupled logic (ECL) can be executed within a few nano-seconds at present, so that it is possible even at present to realize the above-described times of sum operations when the above-described equation is executed in parallel in a suitable manner. When the operation speed is further enhanced in the future, a single operation will become possible instead of the parallel operation.

Referring back to FIG. 6, the signal S1 representing the shift vector $\vec{v}$(p, q) which is derived from the shift vector detector 11 and the left video signal $S_L$ are applied to a left-image shift circuit 12, in which the left image is shifted by the shift vector to obtain a left-image shift signal S2. The signals S1 and S2 are fed to a subtractor 13 to obtain a left-right difference signal S3. The difference signal S3 is applied to a data compression encoder 14, so that a compressed difference signal S4 is obtained. The signals S1, S4 and SL thus obtained are applied to a multiplexer 15 and are multiplexed. Any suitable multiplexing system may be employed depending upon characteristics of the transmission channel 5 (FIG. 5).

On the other hand, in the decoder 6 on the side of the receiver, the transmitted signals are received by a demultiplexer 16 and are separated from each other, so that a reproduced signal SL' of the left image, a compressed difference signal S4' and a shift vector signal S1' are obtained. The compressed difference signal S4' is applied to a data decoder 17, so that an original difference signal S3' is obtained. The signal S1' and SL' are applied to a left-image shift circuit 18, so that a signal S2' representative of a reproduced left image shifted in response to the shift vector $\vec{v}$ (p, q) is obtained. The signal S2' and the decoded difference signal S3' are applied to an adder 19, so that a reproduced signal SR' of the right image is obtained. Any suitable demultiplexing system may be employed depending upon an encoding system employed on the side of the transmitter.

Figure 9A:
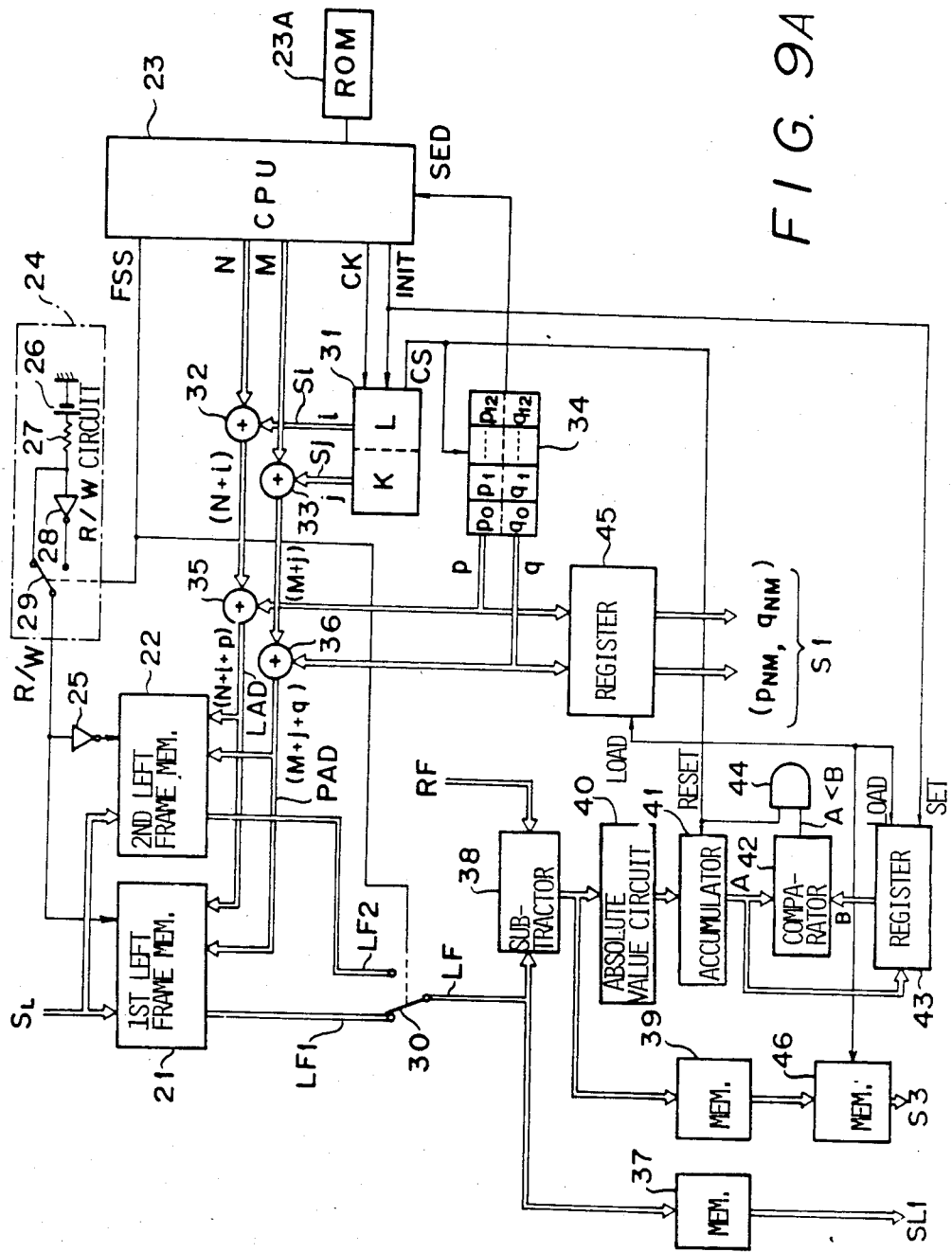
FIGS. 9A and 9B are block diagrams showing an embodiment of the encoder as shown in FIG. 6.

FIG. 9A shows in detail an embodiment of the component parts 11, 12 and 13 shown in FIG. 6. The left video signal SL is alternately stored at a period of one frame in a first frame memory 21 and a second frame memory 22. A timing at which the left video signal SL per frame is alternately stored in the first and second frame memories 21 and 22 is determined by applying a R/W signal directly and via an inverter 25 to the frame memories 21 and 22, respectively The R/W signal is obtained from an R/W control circuit 24 to which a frame sync signal FSS is applied. A read only memory 23A stores a control procedure of a central processing unit 23.

In the R/W control circuit 24, a logic voltage derived from a battery 26 is applied through a resistor 27 directly or via an inverter 28 to a switch 29. In response to a frame sync signal FSS, the switch 29 is switched so that the R/W signal is derived from the switch 29.

The frame sync signal FSS is also applied to a switch 30 so that the readout outputs LF1 and LF2 derived from the first and second left frame memories 21 and 22 are alternately switched to derive a left frame signal $LF = V_L (N+i+p, M+j+q)$. When the switch 30 is held in the position as shown in FIG. 9A, the left video signal is sequentially stored in the frame memory 22, while the left video signal for the preceding frame is derived from the frame memory 21, so that the shift vector is determined in the manner described above.

The data at the address selected by a predetermined line address LAD and a predetermined picture element address PAD is read out from the frame memories 21 and 22. These addresses LAD and PAD are generated in the manner described below. A clock signal CK from the central processing unit 23 is applied to an address counter 31 in which the clock signal CK is frequency-divided by L and K, respectively, for L lines and K picture elements. The signals Si and Sj whose count contents are i and j, respectively, are then derived from the counter 31 and then applied to adders 32 and 33, respectively. Data representative of the upper left address (N, M) of the NM block is applied to the adders 32 and 33 from the central processing unit 23, so that data corresponding to (N+i) and (M+j) are derived from the adders 32 and 33, respectively.

Meanwhile, 13 types of shift vectors $\vec{v}$ (p0, q0), $\vec{v}$(p1, q1), --- and $\vec{v}$(p12, q12) are previously stored in a stack 34 and in response to a carry signal CS from the counter 31, the contents in the stack 34 are sequentially shifted so that data $\vec{v}$ (p0, q0), $\vec{v}$ (p1, q1), --- and $\vec{v}$(p12, q12) are derived from the stack 34. When all the data are derived from the stack 34, a stack-end signal SED is generated. The data p and q from the stack 34 are applied to the adders 35 and 36, in which data p and q are added to the data (N+i) and (M+j), respectively, derived from the adders 32 and 33. As a result, the line address (N+i+p) and the picture element address (M+j+q) are derived from the adders 35 and 36, respectively, and are applied to the frame memories 21 and 22.

Figure 9B:
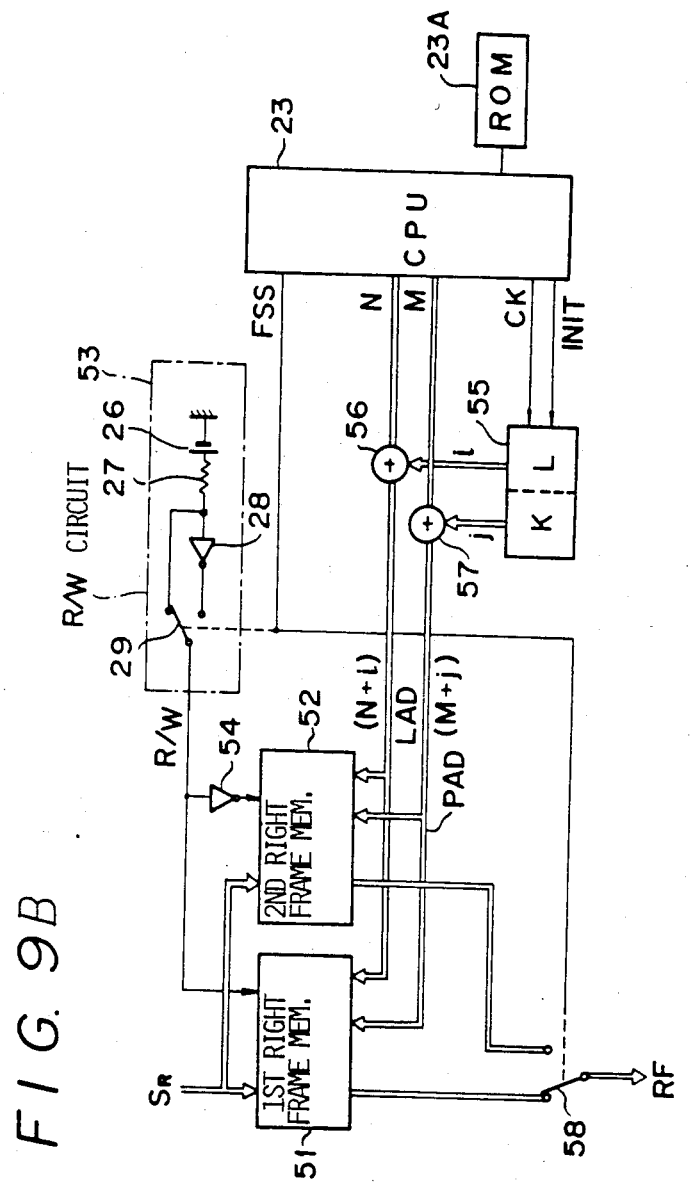

In FIG. 9A, only the two frame memories 21 and 22 for the left image are shown, while two memory frames for the right image are not shown for the sake of simplicity, but, as shown in FIG. 9B, the right image is alternately stored into a first right frame memory 51 and a second right frame memory 52 under the control of a R/W control circuit 53 as in the case of the left frame memories 21 and 22. The line address and the picture element address for reading out the contents in the right frame memories 51 and 52 are the signals (N+i) and (M+j), respectively, obtained by applying the frequency-divided outputs i and j derived from a counter 55 and the addresses N and M to an adder 56 and an adder 57, respectively. By applying the line address and the picture element address to the frame memories 51 and 52, data are read out from these memories 51 and 52 and in response to the frame sync signal FSS, a switch 58 corresponding to the switch 30 in FIG. 9A is switched so as to alternately derive the read out data from the frame memories 51 and 52, thereby obtaining the right frame signal RF=VR (N+i, M+j). The R/W control circuit 53 is substantially similar in construction to the R/W control circuit 24 described above with reference to FIG. 9A. An inverter 54 corresponds to the inverter 25 shown in FIG. 9A.

The left frame signal $L_F = V_L(N+i+p, M+j+q)$ is stored into a memory 37 and the left and right frame signals $V_L(N+i+p, M+j+q)$ and $V_R(N+i, M+j)$ are applied to a subtractor 38, in which the following subtraction is carried out:

$$|V_R(N+i, M+j) - V_L(N+i+p, M+j+q)|.$$

The output from the subtractor 38 is written into a buffer memory 39 per block unit and is also applied to an absolute value circuit 40, in which the absolute value of the subtraction output is obtained as follows:

$$|V_R(N+i, M+j) - V_L(N+i+p, M+j+q)|.$$

The absolute value circuit 40 may be formed by an ROM storing a table which is so arranged that when the subtraction output is positive, the value of the output per se is outputted directly, and that when the output is negative, the value without the minus sign is outputted.

The output signal derived from the absolute value circuit 40 and corresponding to the absolute value of the difference is applied to and accumulated in an accumulator 41. The content in the accumulator 41 is applied to a comparator 42 and also to a register 43. The content B in the register 43 is applied to the comparator 42 to be compared with the content A of the accumulator 41. The comparator 42 delivers its output when A<B. The output signal derived from the comparator 42 and the carrier signal CS derived from the counter 31 are applied to an AND gate 44 which in turn delivers an AND output when the condition A<B is established upon completion of the operation of the counter 31. The AND output derived from the AND gate 44 is applied as a load signal to the register 43 and then in response to the content in the accumulator 41, the content in the register 43 is refreshed.

The output (p, q) from the stack 34 is also applied to the register 45 and in response to the output signal from the AND gate 44, the content in the register 45 is refreshed. The output from the AND gate 44 is also applied to a memory 46. In response to the AND output from the AND gate 44, the content stored in the buffer memory 39 is stored as a difference signal S3 into the memory 46. After all the (p, q) candidates have been compared, the selected (p, q) is applied as the left-right difference signal S3 to the data compression encoder 14 (See FIG. 6). It should be noted here that the capacity of each of the memories 37, 39 and 46 is equal to one block (K×L picture elements).

Now, a signal SL1 corresponding to the left video signal $S_L$ is stored in the memory 37. The difference signal S3 is stored in the memory 46. The minimum shift vector S1 is stored in the register 45. In response to a predetermined timing, these signals are read out and applied to the data compression encoder 14 and the multiplexer 15 shown in FIG. 6. When (p, q)=(0, 0); that is, when the shift is zero, the output LF from either of the left frame memories 21 and 22 is stored in the memory 37 and then delivered to the multiplexer as the left video signal.

Referring still to FIG. 9A, when the stack 34 has read out its all contents from (p0, q0) to (p12, q12), it generates the stack end signal SED, which in turn is applied to the central processing unit 23. In response to an initialize signal INIT delivered from the central processing unit 23, the counter 31 is initialized to (i, j)=(0, 0) and the register 43 is set in the manner to be described below. In response to the carry signal CS, the accumulator 41 is reset.

The central processing unit 23 sets the addresses N and M at the upper left of the NM block and simultaneously in response to the initialize signal INIT, the content in the register 43 is set to its maximum value. The output (p0, q0) is delivered as (p, q) from the stack 34 in which the shift vector candiates are stored. Next, in response to the clock CK, the counter 31 is actuated so that the value of (j, i) varies sequentially in the following order: (0, 0), (1, 0), ... (K−1, 0), (0, 1), (1, 1), ..., (K−1, 1), ..., (K−1, L−1). In response to these variations, the line address=N+i+p and the picture element address=M+j+q are also varied and when the switches 29 and 30 are held in the positions, respectively, as shown in FIG. 9A, LF1 is delivered from the first left frame memory 21 while RF1 (N+i, M+j) is delivered from the right frame memory (not shown).

As a result, |RF−LF| is stored in the accumulator 41. In this case, the accumulator 41 accumulates the difference absolute value output from the absolute value circuit 40 until the carry signal SC is generated upon completion of a series of steps of the counter 31 in response to K×M clock signals CD per block. The comparator 42 compares the output A from the accumulator 41 with the output B from the register 43 and when the condition A<B is established upon completion of the operation of the counter 31, the content of the register 43 is replaced with the content in the accumulator 41 and a new (p, q) is stored in the register 45.

Furthermore, in response to the carry signal CS, the contents in the stack 34 are sequentially refreshed so that all the 13 shift vector candiates are compared. As a result, $(p, q) = (P_{NM} - q_{NM})$ which gives the minimum absolute value of the sum of the differences is stored in the register 45.

Thereafter, the system returns to its initial state, so that the values of N and M are changed to the addresses of the next block and the shift vector is compared in the manner described above in the next block.

The shift vectors thus obtained in the respective blocks are temporarily stored in a suitable manner and used to obtain the next difference signal.

Figure 10:
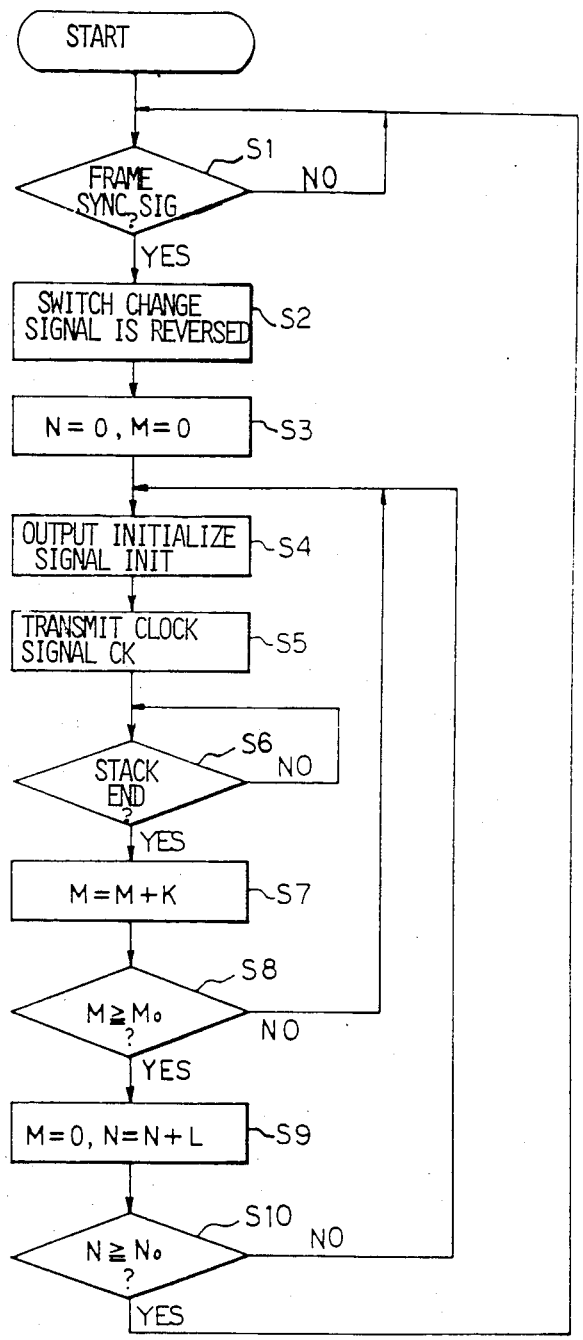
FIG. 10 is a flowchart showing an embodiment of a control procedure of the encoder as shown in FIGS. 9A and 9B.

FIG. 10 shows an example of a control sequence of the central processing unit 23 shown in FIGS. 9A and 9B. The control sequence is stored in the read only memory 23A.

Referring now to FIG. 10, in response to the frame sync signal, the sequence proceeds from step S1 to step S2 in which the switches 29, 30 and 58 are switched. As a result the switch 29 sets the first left frame memory into the read mode, so that LF1 signal is derived from the switch 30. The second left frame memory 22 is set to the write mode, so that the left video signal $S_L$ is stored therein. Alternately, the switching of the switch 29 drives the first frame memory 21 into the write mode, so that the left video signal $S_L$ is stored therein, while the second left frame memory 22 is driven into the read mode, so that the signal LF2 is delivered from the switch 30.

Next, in step S3, N=0 and M=0 are set and then in step S4, the initialize signal INIT is outputted, so that the register 43 is set to its maximum value, while the address counter 31 is cleared to (i, j)=(0, 0).

Subsequently, in response to the clock signals CK sequentially applied from the central processing unit 23 to the address counter 31, the circuit as shown in FIGS. 9A and 9B are activated, so that the stack 34 sequentially delivers (p, q). When all the contents in the stack 34 have been delivered out; that is, when the processing for one block has been accomplished, the stack end signal SED is generated.

In step S6, the generation of the siganl SED is judged and when the stack end mode is detected, the procedure proceeds to step S7, in which M is changed to M+K. In step S8, M≧Mo (where Mo is the number of picture elements along one line) is judged. If M<Mo, the program returns to step S4, so that the processing on the same line but in another block is carried out. If M≧Mo, the program proceeds to the block in the next line, i.e., to step S9, in which M is set to 0 and N is set to N+L. In step S10, N≧No (where No is the number of lines in one block) is judged. If N<No, the program returns to step S4, so that the processing of the sequential blocks on the same line is carried out. If N≧No, it is judged that all the blocks in one frame have been completely processed. As a result, the program returns to step S1.

Figure 11:
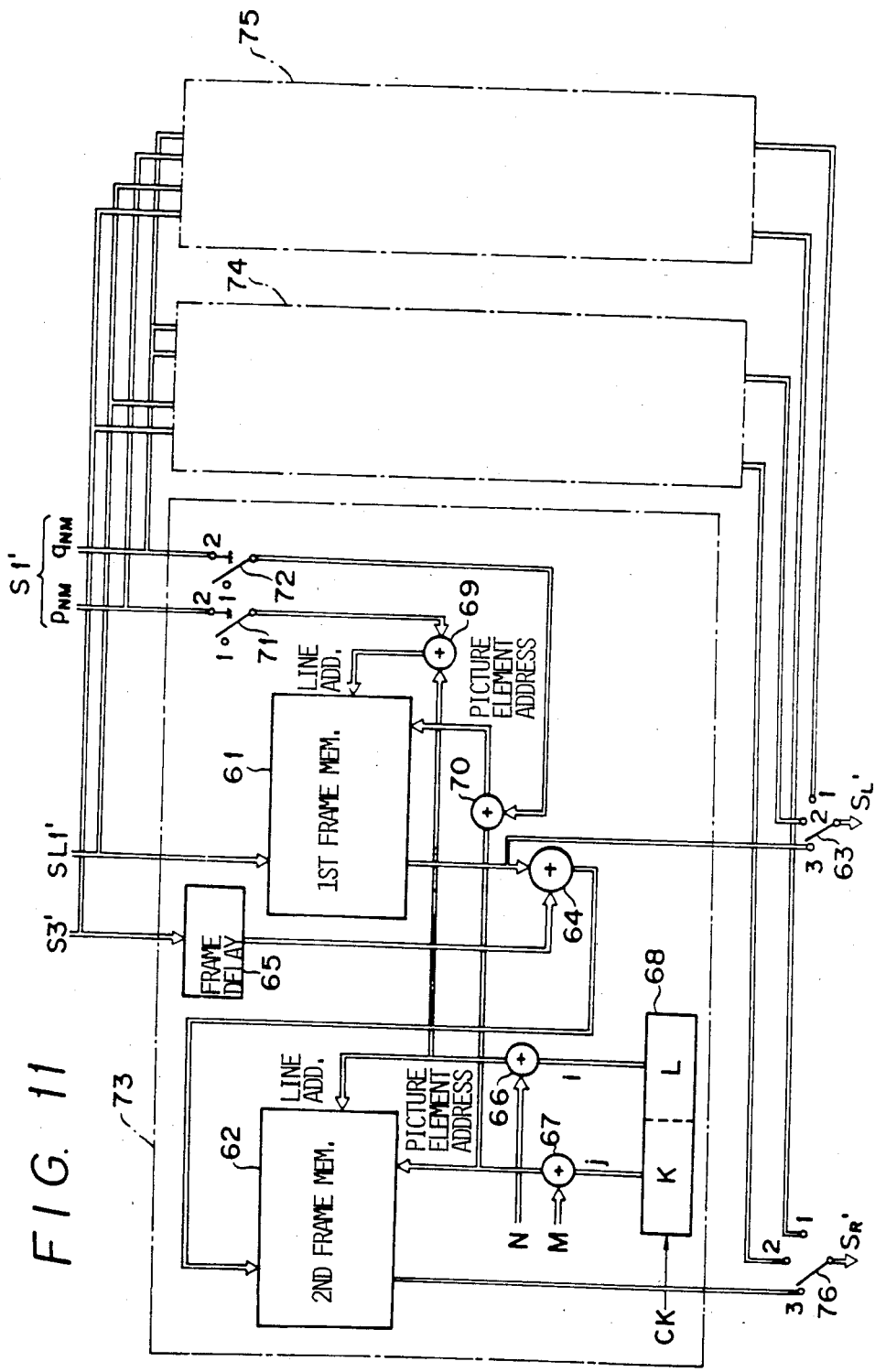
FIG. 11 is a block diagram showing an embodiment of the decoder as shown in FIG. 7.

FIG. 11 shows in detail an embodiment of the arrangement of the component parts 18 and 19 on the receiver side shown in FIG. 7. There are provided a first frame memory 61 and a second frame memory 62. The left video signal SL1' from the demultiplexer 16 representing, for instance, the left image data of the NM block is stored into the first frame memory 61.

The left video signal of one frame stored in the first frame memory 61 is read out in the manner to be described below. The read out signal is derived as the reproduced left video signal $S_L'$ through a switch 63 and also is applied to an adder 64 to which the left-right difference signal S3' is applied through a frame delay 65. The adder 64 adds both the signal to each other and the addition output from the adder 64 is applied to the second frame memory 62.

The signal is read out from the frame memories 61 and 62 at the addresses determined in a manner to be described below.

Next, the method for generating addresses for reading out the signals from the first and second frame memories 61 and 62 will be described. First, the addresses N and M are set to the frame memories 61 and 62 through adders 66 and 67 by the central processing unit 23. The count values i and j, which are obtained by frequency-divisions of the clock signal CK by L and K, respectively, in the counter 68 driven in response to the clock signal CK, are also applied to the adders 66 and 67, respectively, so that (N+i) and (M+j) are formed by the adders 66 and 67. These data (N+i) and (M+j) are fed as the line address and the picture element address, respectively, to the second frame memory 62 and to adders 69 and 70, respectively. $p_{NM}$ and $q_{NM}$ of the shift signal S1' derived from the demultiplexer 16 are also applied through switches 71 and 72 to the adders 69 and 70, respectively. The outputs from the adders 69 and 70 are applied as the line address and the picture element address to the first frame memory 61, respectively.

More particularly, at phase 1, the left video signal $S_L'$ derived from the demultiplexer 16 on the side of the receiver is written into the first frame memory 61. In this case, the switches 71 and 72 are switched to positions "1", so that the line address and the picture element address in the first frame memory 61 are (p, q)=(0, 0). As a result, the left video signal $S_L'$ of the NM block is correctly stored in the first frame memory 61. By varying the address (N+i, M+j), the above-described processing is performed for all the blocks, so that the entire left image is stored in the first frame memory 61.

In the following phase 2, the switches 71 and 72 are switched to positions "2", so that a value of (p, q) is obtained from the demultiplexer 16. In phase 2, the first frame memory 61 is in the readout mode, while the second frame memory 62 is in the write-in mode.

In this case, the line address of the first frame memory 61 is (N+i+p) while the picture element address is (m+j+q), and the line address of the second frame memory 62 is (N+i), while the picture element address thereof is (M+j). As a result, the block content in the first frame memory 61 is shifted by the shift vector (p, q) and then read out. On the other hand, the left-right difference signal S3' obtained by decoding the compressed left-right difference signal S4' derived from the demultiplexer 16 passes through a frame delay 65 for delaying the signal to adjust a period of time required for accomplishing the processing in phase 1 and then is applied to the adder 64 to which the output derived from the first frame memory 61 is also applied. The output from the adder 64 is applied to a block in the second frame memory 62.

In phase 3, both the first and second frame memories 61 and 62 are in the readout mode and the addresses are so controlled as to correspond to the scanning of a television system. As a consequence, a reproduced left video signal SL' is derived from the first frame memory 61, while a right video signal SR' corresponding to a right image obtained by adding the difference signal S3' to the shifted left video signal SL' is derived from the second frame memory 62.

As described above, the whole operation on the side of the receiver is carried out through the three phases, so that three circuits 73, 74 and 75 indicated by blocks shown by the dash and dotted lines are provided. The outputs read out from the first and second frame memories 61 and 62 in the respective blocks 73, 74 and 75 are sequentially switched by switching the switches 63 and 76 sequentially to positions "1", "2" and "3" to reproduce an original image.

On the receiver side, like in the case of the transmitter, a central processing unit generates the address data N and M, the clock signal CK, the television scanning sync signal TVS and switching timing signals for actuating the switches 63, 71, 72 and 76.

In the first embodiment, the left and right images are directly divided into blocks so as to obtain the shift signals. Alternatively, in the pre-stage preceding the encoder 4 shown in FIG. 5, the shift of the entire image is searched by reducing the member of the sampling points and the entire image shifted is encoded. Then, a region in which a shift vector is searched by the shift vector detector for detecting a shift vector in each block becomes smaller, so that it is sufficient that the operation speed is slow and no high speed operation is needed.

Figure 12:
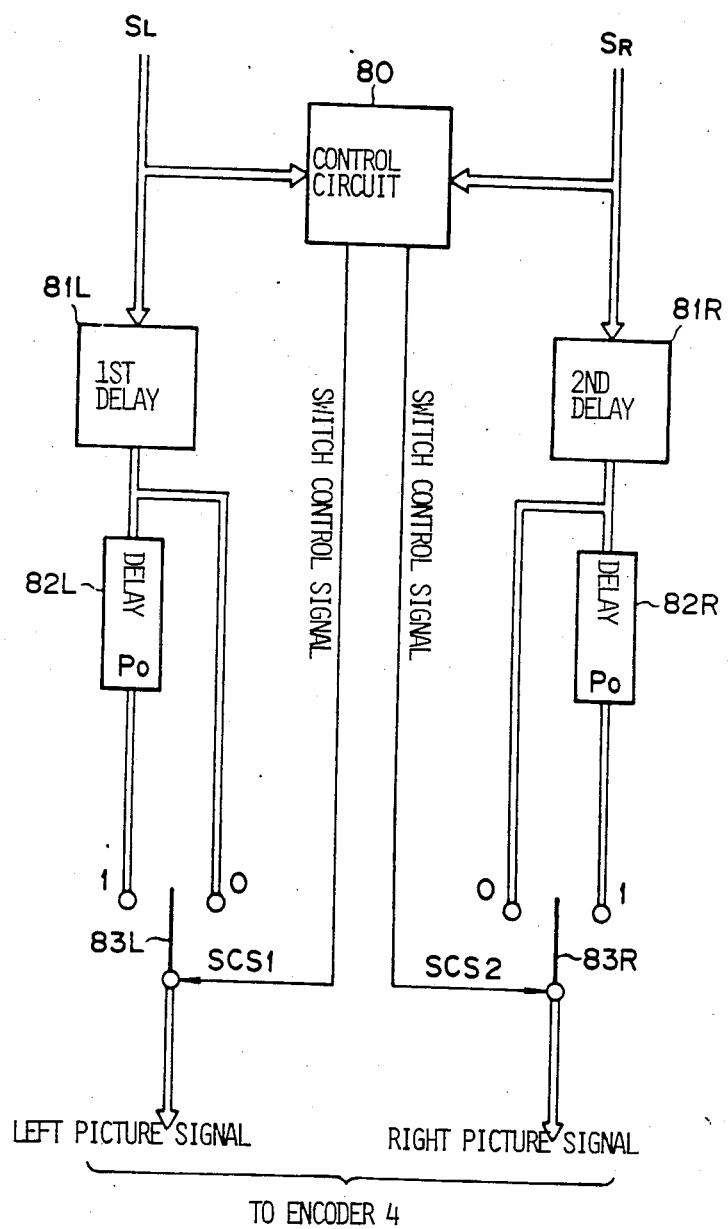

A second embodiment of the present invention capable of the above-described operation is shown in FIGS. 12–15. That is, in accordance with the second embodiment, the circuit as shown in FIG. 12 is connected to the input side of the encoder 4 shown in FIG. 5.

Figures 15, 16:
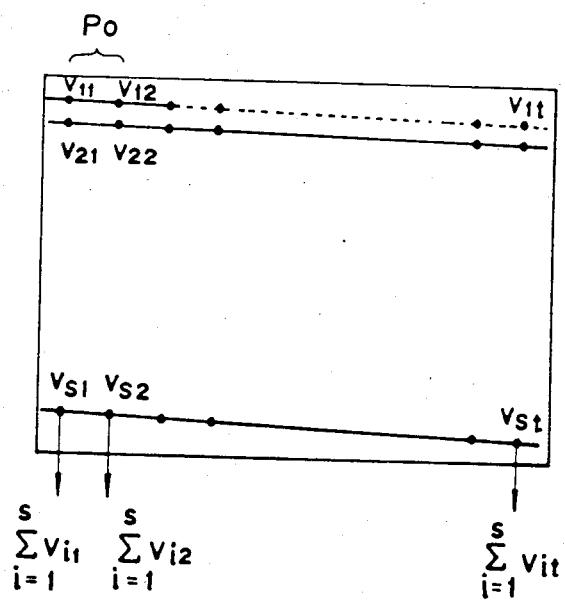
FIG. 15 is a table diagram showing an example of contents in the ROM 96 shown in FIG. 13.
FIG. 16 is an explanatory diagram used to explain an underlying principle of this embodiment of the present invention.

In the following discussion, for the sake of simplicity, it is assumed that the shift takes place only in the right and left directions and that shifts are limited to the three types; that is, −Po, O and +Po. Here, as shown in FIG. 16, the following data are obtained by sampling an image at an interval of Po picture elements:

$v11, v12, \ldots, v1t$ (data on the first line)

.
.
.

$vs1, vs2, \ldots, vst$ (data on the last line).

These data are added in the vertical direction so that the following data are obtained:

$$\sum_{i=1}^{s} v_{i1} \sum_{i=1}^{s} v_{i2} \ldots \sum_{i=1}^{s} v_{it} = V_1 = V_2 = V_t.$$

Both the left and right images are processed in the manner described above, so that the data $(V_{R1}, V_{R2} \ldots V_{Rt})$ and $(V_{L1}, V_{L2}, \ldots V_{Lt})$ corresponding to $V_1, V_2, \ldots V_t$ are obtained. Thereafter, a sum of an absolute value of the difference between these two sets of data is obtained by shifting the above two sets of data by ±1 and 0.

$$\sum_{j=1}^{s} |V_{Rj+m} - V_{Lj+n}| \quad (m - n = -1, 0 \text{ and } 1).$$

Next, it is determined which of the shift (+Po, O, −Po) minimize the above-described value. Thereafter, the left and right images are delayed relative to each other so as to shift the images.

Referring back to FIG. 12, a control circuit 80 has an arrangement as shown in FIG. 13 and a first delay circuit 81L and a second delay circuit 81R are adapted to delay the video signal for a period of time equal to the processing time required by the control circuit 80 (about one frame period), so that switch control signals SCS1 and SCS2 from the control circuit 80 correctly process the image.

Reference numerals 82L and 82R denote delay circuits for delaying the signal for a period of time corresponding to Po picture elements. Reference numerals 83L and 83R denote switches controlled in response to the switch control signals SCS1 and SCS2 from the control circuit 80. That is, when the switches 83L and 83R are switched to positions "0", the outputs from the first and second delay circuits 81L and 81R are directly derived therefrom, while when the switches 83L and 83R are switched to positions "1", the outputs from the first and second delay circuits 81L and 81R are derived therefrom through the delay circuits 82L and 82R, respectively.

Referring now to FIG. 13, the left and right image data SL and SR are sampled at the interval of Po picture elements by samplers 84L and 84R and the sampled data are applied through adders 85L and 85R to t-stage shift registers 86L and 86R, respectively.

The shift registers 86L and 86R are cleared in response to the frame sync signal and accordingly the switches 83L and 83R are switched to positions "1". As a result, the sampler outputs and the right side terminal outputs of the shift registers 86L and 86R are delayed by one line, so that the upper and lower picture elements are added by the adders 85L and 85R, respectively. Such processing is carried out for a period of one frame, so that the data corresponding to $V_1, V_2, \ldots V_t$ are stored in the respective stages 1, 2, . . . , and t, respectively, of the shift registers 86L and 86R.

Reference numerals 87, 88 and 89 denote summation circuits, each for obtaining the sum of the absolute values of differences between the left and right images and can be arranged, for example, as shown in FIG. 14.

Referring next to FIG. 14, reference numeral 90 designates a subtractor. Reference numeral 91 denotes an absolute value circuit for obtaining an absolute value of an output from the subtractor 90 and may be in the form of ROM as in the case of the circuit described with reference to FIG. 9. Reference numeral 92 designates an accumulator for obtaining the sum of the absolute values of differences derived from the absolute value circuit 91.

When the above-described processing is completed, contents of the accumulators 92 in the summation circuits 87, 88 and 89 are cleared.

Under these conditions, the contents in the shift registers 86L and 86R are sequentially shifted by the number of their stages. The summation circuit 88 is connected to the second stage of the shift register 86R and to the first stage of the shift register 86L, so that an output B from the summation circuit 88 is given by $$B = \sum_{i=1}^{t} |V_{Ri+1} - V_{Li}|.$$

In like manner, outputs A and C from the summation circuits 87 and 89 are, respectively, $$A = \sum_{i=1}^{t} |V_{Ri} - V_{Li}|$$

and $$C = \sum_{i=1}^{t} |V_{Ri} - V_{Li+1}|.$$

These outputs A, B and C are compared with each other by comparators 93, 94 and 95, respectively, and the outputs C1, C2 and C3 from the comparators 93, 94 and 95 are applied to an ROM 96, which in turn generates the switch control signals SCS1 and SCS2 according to a minimum value given by either of the outputs A, B and C.

The respective outputs from the comparators 93, 94 and 95 are determined as follows:

(1)
  $A \leq B : C1 = 1$
  $A > B : C1 = 0$ (2)
  $B \leq C : C2 = 1$
  $B > C : C2 = 0$ (3)

$C \leq A : C3 = 1$
$C > A : C3 = 0$

The ROM 96 stores contents as shown in FIG. 15, for instance. When A=B=C=1, either of A, B and C results in the minimum value, so that A is stored in the ROM 96. In FIG. 15, a hatched portion represents irrational combinations so that this portion is neglected here.

For instance, assume that (C1, C2, C3)=(0, 1, 0). Then, A>B, B≧C and C>A. Accordingly, the output B becomes minimum. Therefore, it is seen that it is sufficient to shift the right image by Po rightward of the left image. To this end, it is seen that it is sufficient to delay the left image by Po picture elements by the delay circuit 82L. That is, after delaying the left video signal under the conditions of SCS1=1 and SCS2=0, the delayed left video signal is transmitted to the encoder 4 in the next stage.

Alternatively, in order to lower the cost of the apparatus, similar signal processing may be carried out by shifting the entire image without dividing the image into blocks and using a left-right difference signal corrected in accordance with the entire shift.

Figure 17:
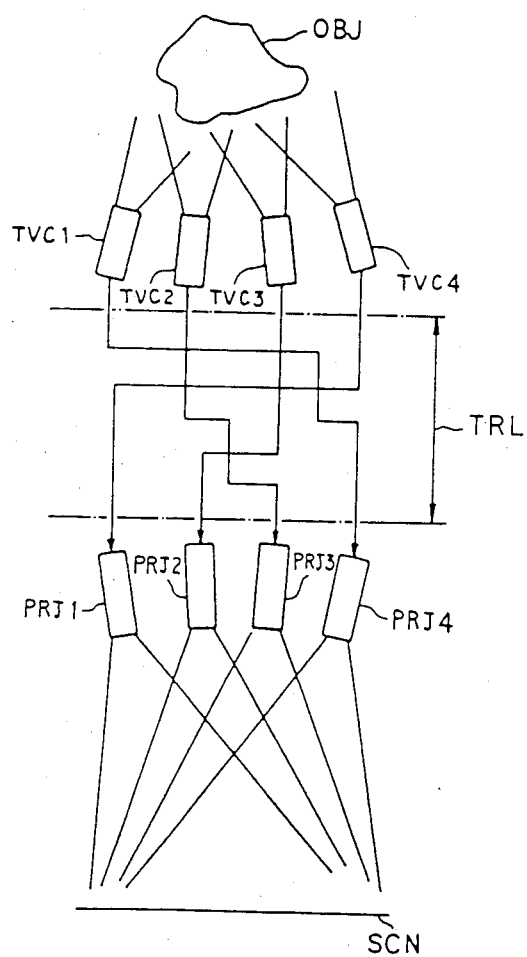
FIG. 17 is a schematic diagram showing a further embodiment of the present invention.
Figure 18:
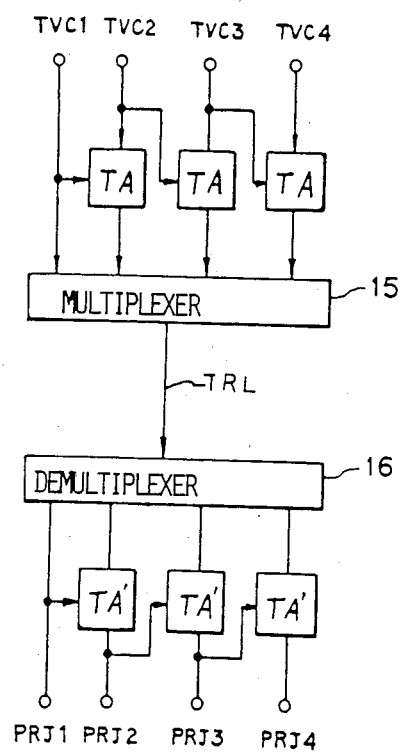
FIG. 18 is a block diagram showing more detailed arrangement thereof.

Next, a third embodiment of the present invention in which three or more television cameras are used will be described. The third embodiment is, therefore, a multiocular system. For instance, as shown in FIG. 17, there is established one-to-one relationship between a plurality of television cameras TVC1-TVC4 on the one hand and a plurality of projectors PRJ1-PRJ4 on the other hand through a transmission line TRL. The images of one object OBJ are picked up by the four television cameras TVC1-TVC4 and the four projectors PRJ1-PRJ4 project a reproduced image of the object OBJ on a screen SCN.

In the third embodiment of the present invention, arrangements TA of the type described above with reference to FIG. 9 are arranged between the systems of the television cameras TVC1 and TVC2, the systems of the television cameras TVC2 and TVC3 and the systems of the television cameras TVC3 and TVC4. The shift vectors and the left-right difference signals obtained from the respective systems are transmitted together with the video signal derived from the television camera TVC1 via the multiplexer 16 to the projectors PRJ1-PRJ4. On the side of the projectors, the signals separated by the demultiplexer 16 are fed into arrangements TA' of the type described above with reference to FIG. 11, so that the video signals to be supplied to the projectors PRJ-PRJ4 are generated.

Alternatively, the television camera TVC1 may be used as a reference and the present invention may be applied to the respective systems of the television cameras TVC1 and TVC2, TVC1 and TVC3 and TVC1 and TVC4.

When the present invention is compared with, for instance, "Encoding System Between Motion Correction Frames", Ninomiya et al., NHK Technical Journal, Vol. 88, No. 1, p. 24 (1981), it seems that both are similar in arrangement, but the following remarkable differences exist between them.

One of the most remarkable differences between them resides in the following. While in the above-described literature, a motion is corrected between the frames by utilizing a correlation on the time axis between two consecutive frames, according to the present invention, a correlation between frames with respect to left and right picture elements picked up simultaneously; that is, a correlation between frames with respect to images viewed simultaneously by the left and right eyes is utilized.

In the case of a stereoscopic image reproduced in accordance with the present invention, the left and right images of any object correspond to information percieved by the left and right eyes, respectively, and the left and right eyes simultaneously view the same object so that frame images to be compared are substantially the same.

On the other hand, in the above-described literature, when there occurs a motion, the difference between the two sequential frames cannot be minimized unlike the left-and-right difference signal obtained by the present invention, even when a vector of the motion is detected and the image is shifted in accordance with the detected vector so as to obtain a difference between the two frames. That is, according to the present invention, a correlation between the left and right image obtained simultaneously is large regardless whether or not there exists a motion. Therefore, the information representative of the difference between the left and right frames is small. The present invention utilizes this fact to remarkably compress information required both for the transmission of the left and right images.

In the above-described literature, images in sequential frames are different in time, so that when a cut or scene is changed, the frame images become greatly different from each other As a result, while in the case of stereoscopic view, a redundancy of information of the left and right images is always great, a redundancy hardly exists in the case of the above-described literature, when a cut is changed, and therefore it is necessary to transmit information for another frame. The purpose of correcting a motion in the above-described literature resides in the fact that information to be transmitted is so compressed that it can be transmitted in a band narrower than a bandwidth required for transmitting one frame of the information. However, when a cut is changed, the transmission requires a few frame periods, and consequently a correction between frames becomes ineffective. On the other hand, according to the present invention, even when a cut is changed, left and right images are substantially the same, so that the above described problems will not occur in the present invention.

In addition, in the above-described literature, a motion is not anisotropic in both the vertical and horizontal directions, but in the case of stereoscopic image, a main deviation occurs in the horizontal direction and a vertical deviation is auxiliary. As a result, it suffices to define vertically elongated blocks so that an image is roughly divided in the vertical direction Furthermore, as to a shift vector, it suffices to derive only a shift vector in the horizontal direction, and accordingly, a stereoscopic television signal transmission system can be made simple in arrangement.

Moreover, in the above-described literature, a moving part is of secondary importance as compared with a stationary part, so that in the case of a motion such as panning, information on a large area can be transmitted by one motion vector. In the case of stereoscopic image, an object is essentially three dimensional and is not anisotropic phisically, so that it is necessary to divide an image into small regions and to determine different shift vectors for the respective regions.

Figure 19:
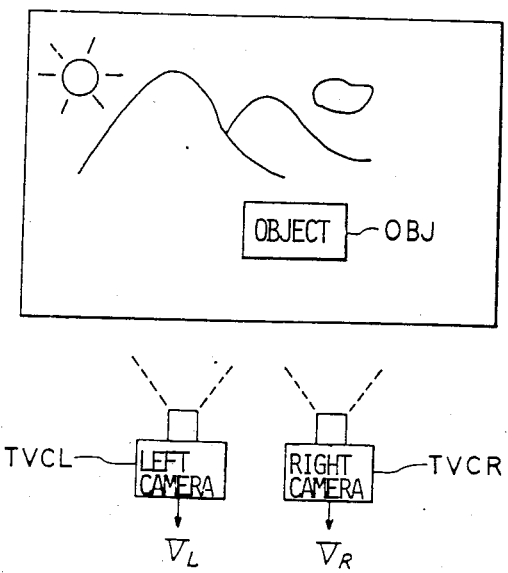
FIG. 19 is an explanatory diagram used to explain a principle of obtaining a stereoscopic video signal.

Next, a fourth embodiment of the present invention will be described. FIG. 19 is an explanatory diagram used to explain the principle of obtaining two video outputs by locating left and right television cameras TVCL and TVCR at positions corresponding to a parallax between eyes so as to pick up images of background and an object OBJ. The left camera TVCL delivers a video output VL, while the right camera TVCR delivers a video output VR.

Figure 20:
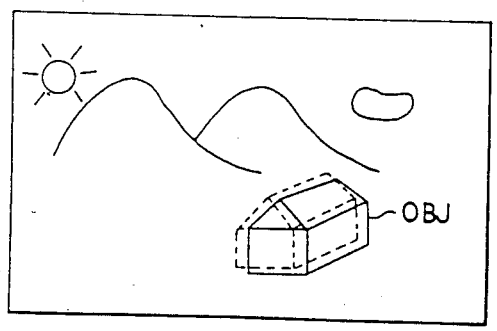
FIG. 20 is an explanatory diagram illustrating an example of a video output.

FIG. 20 shows examples of the video outputs VL and VR obtained in the manner described above with reference to FIG. 19. The right camera output VR is indicated by the solid lines, while the left camera output VL is indicated by the broken lines. It is apparent that the parallax between the right and left eyes occurs only for the object OBJ located at a shorter distance from the television cameras TVCL and TVCR. Its time difference is considerably short and is of the order of less than one microsecond. As a result, a difference signal (that is, the parallax signal) between the left and right images of the background is almost zero and a difference signal has a predetermined component only when the object OBJ produces parallax at a short distance In order to reproduce a three-dimensional image, the size of the object OBJ must be large enough to cause parallax. Now, let us consider an example in which nine hexahedrons having 6 micro seconds in length are displayed on a CRT screen and are spaced apart from each other by one micro second. The image picked up by the left camera is indicated by the solid lines, while the image picked up by the right camera is indicated by the broken lines. In this case, assume that as shown in FIGS. 21B and 21C, parallax on the extraction line EL be one microsecond. Then, as shown in FIG. 21D, a parallax difference output VL−VR is obtained. That is, the signal exists only for 14 microseconds ($18 \times 0.8 \approx 14$) out of $(6+1) \times 9 = 63$ microseconds. The reason is that only 80% of the picture elements are effectively displayed on the CRT screen. In this case, it is assumed that the picture elements corresponding to the parallax difference have no correlation at all, but in practice, the difference may be considered as one kind of one dimensional prediction DPCM signal.

It is well known in the art that in the case of one dimensional prediction DPCM, an original image can be compressed to an image which is less than 50% of the original image. Therefore, if the one dimensional prediction DPCM is applied to the case of the example shown in FIGS. 21A–21D, it is understood that the image can be compressed to a size less than $(14/63) \div 2 = 7/63$. However, this is a special case in which images have no correlation at all, and in practice the images have correlation, and thus if we consider this correlation, a further compression is possible. Therefore, a compression rate $a$ with respect to the parallax signal may be considered about 10% at the most.

As described above, the parallax appears only when an object at a short distance from the eyes is viewed and includes positional shifts When a positional shift is detected and a parallax signal is obtained by using a signal in which a position is corrected, a difference output can be further reduced as compared with the abovedescribed embodiments of the present invention. The present invention utilizes a view-point distribution (to be described in more detail hereinafter with reference to FIGS. 23A and 23B) in order to detect the parallax FIGS. 22A–22D illustrate a principle of detecting parallax in accordance with the present invention. In FIG. 22A, an image obtained but the left camera TVCL is indicated by the solid lines, while an image obtained by the right cameras TVCR is indicated by the broken lines. FIG. 22B illustrates a left camera output VL and FIG. 22C illustrates a right camera output VR. FIG. 22D illustrates a parallax output (VL−VR) when the images of an object are picked up by the left and right cameras. It is determined that there exists some object as a short distance object within a short distance causing parallax, when the parallax output (VL−VR) exceeds a predetermined threshold level TH.

As described above, the underlaying principle resides in the fact that a difference between two camera outputs which is caused by parallax is compressed as much as possible, using the shifted signal in which the position is corrected is obtained and that the difference is compressed as much as possible.

A transmission and detection procedure of a video signal in the fourth embodiment of the present invention will be described.

Figure 23A:
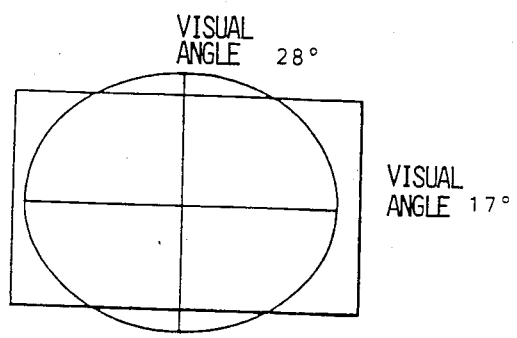
FIGS. 23A and 23B are explanatory diagrams illustrating a view-point distribution in a high definition television system in accordance with the present invention and a view-point distribution in the conventional 525 type television system, respectively.
Figure 23B:
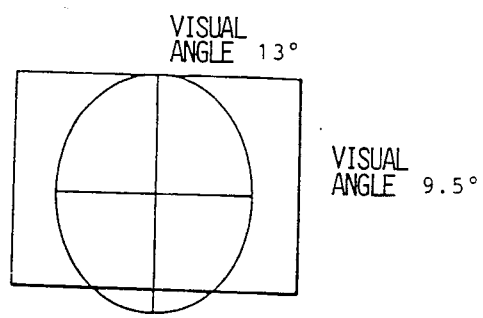

Referring next to FIGS. 23A and 23B, there are illustrated view-point distributions of television pictures reproduced by a high definition television system and by the conventional television system (525 system), respectively. In FIGS. 23A and 23B, an ellipse shows a region in which lines of vision move and they are concentrated in this region with a probability of 99.73%.

As is clear from FIG. 23B, according to the conventional television system, the lines of vision are concentrated at the center portion of the picture displayed and as is clear from FIG. 23A, in the case of the high definition television system, the lines of vision are expanded laterally.

Therefore, if we consider the fact that the parallax appears only when one views an object at a short distance (an object within about ten meters from the eyes) and due to the fact that an object at a short distance locates in general in the center portion of a picture, a stereoscopic television picture can be transmitted by transmitting mainly the parallax information in the center portion of a picture in which the lines of view are concentrated and by reproducing the parallax information thus transmitted at a high degree of fidelity on a receiver side.

In view of the above, in the fourth embodiment of the present invention, a picture is divided into a plurality of positional shift detection blocks as shown in FIG. 24 in the case of the conventional television system and as shown in FIG. 25 in the case of the high definition television system (MUSE).

That is, blocks in the center portion of a picture in which a high degree of stereoscopic resolution is required are made smaller than blocks in the periphery of the picture. For instance, parallax detection blocks can be determined depending upon a ratio of a reciprocal of a view point density. Then, it becomes possible to transmit a stereoscopic image adapted to a motion of the line of vision when one watches a television screen.

Figure 26:
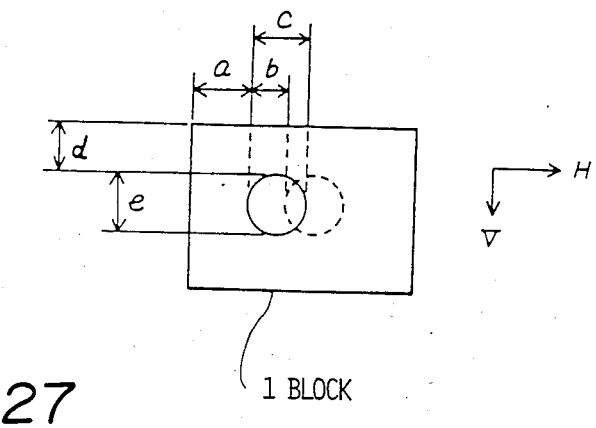
FIG. 26 is an explanatory diagram used to explain an example of parallax detection based on the principle described with reference to FIGS. 22A-22D.

FIG. 26 shows an example of a result of parallax detections within the respective blocks shown in FIGS. 24 and 25. In FIG. 26, a designates a lateral parallax position; b, a lateral shift of parallax (parallax vector); c, a lateral length of a parallax object; d, a line number at which the parallax first appears in the vertical direction (vertical parallax position); and e, a vertical length of the parallax object. As will be described in detail hereinafter, information of these positions are obtained on the transmitter side, so that the information is multiplexed in a vertical blanking period and the multiplexed signal is transmitted.

In order to detect the parallax vector b in practice, a difference between the corresponding picture elements in each block is calculated. In the case of a picture in which a large number of parallax objects exist in the same block (that is, when an image contains a large number of high frequency components), a parallax of the largest parallax object or a signal representative of an average parallax is transmitted. For instance, in the case of an image such as obtained by picking up an image of a fine leaf, it is preferable that its average parallax is converted into a signal which in turn is transmitted.

Next, a bit distribution will be specifically described. As to (a+c) shown in FIG. 26, there exists a relation that when the position a is shifted rightward, the value of c becomes less. Therefore, in the case of the 525 system, 8 bits (capable of displaying 256 positions) are selected as quantization levels for representing (a+c). In the case of the MUSE system, 9 bits are assigned as quantization levels for representing (a+c). In like manner, in the case of the 525 system, b is expressed by 6 bits and in the case of MUSE system, b is also represented by 6 bits. As in the case of (a+c), in the 525 system, (d+e) is represented by 6 bits, while in the MUSE system, it is expressed by 7 bits. As a result, in the case of the 525 system, a+b+c+d+e has 20 bits, and a+b+c+d+e has 22 bits in the MUSE system.

With respect to the number of picture elements within one horizontal (1H) period in the 525 television system, the picture elements are sampled at a frequency four times higher than the subcarrier, and if the number of effective picture elements which can be displayed on the television screen is 80% of the total picture elements, about 720 picture elements can be obtained. In view of the above, in FIG. 24, one picture is divided into four blocks in the horizontal direction and it is seen that it is sufficient that 8 bits (1-256 levels) are assigned to (a+c).

In like manner, in the case of the high definition television system, the bandwidth of the luminance signal is 20 MHz, and thus if sampling is made at 40 MHz, the number of effective picture elements becomes about 2033, which is obtained from 80% of the total number of sampled picture elements. Therefore, in the case of the high definition television system, it is sufficient that one picture is divided into 8 blocks in the horizontal direction and that (a+c) has 9 bits (1-512 levels).

A required parallax data is transmitted within 1H in a vertical blanking period A transmission capacity within 1H is 364 bits in the case of character broadcasting system such as teletext system. In the case of the 525 television system, the number of bits needed to transmit position information is 20 bits×16 (blocks)=320 bits, which can be completely transmitted within 1H. On the other hand, in the case of the MUSE system, the bandwidth is 8 MHz so that a transmission at a double bit rate (that is, 720 bits within 1H) is possible. In this case, the required number of bits is 22 bits×32 (blocks) =704 bits, which can be completely transmitted within 1H.

Figure 27:
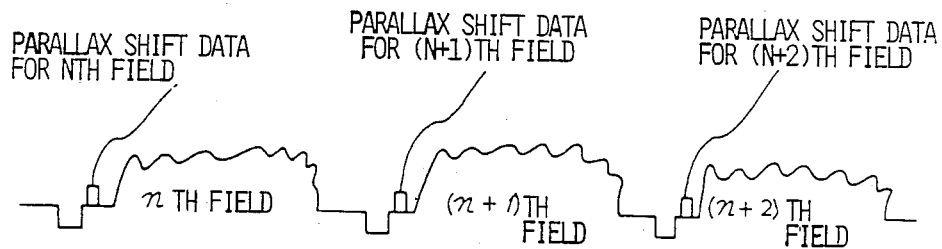
FIG. 27 is an explanatory diagram used to explain an example of a method of transmitting a data signal.

FIG. 27 illustrates transfer timings for a parallax shift data. Parallax shift data to be transmitted is inserted into blanking periods preceding video signals. Then, the receiver can have an ample processing time and furthermore the apparatus can be made compact in size.

Figure 28:
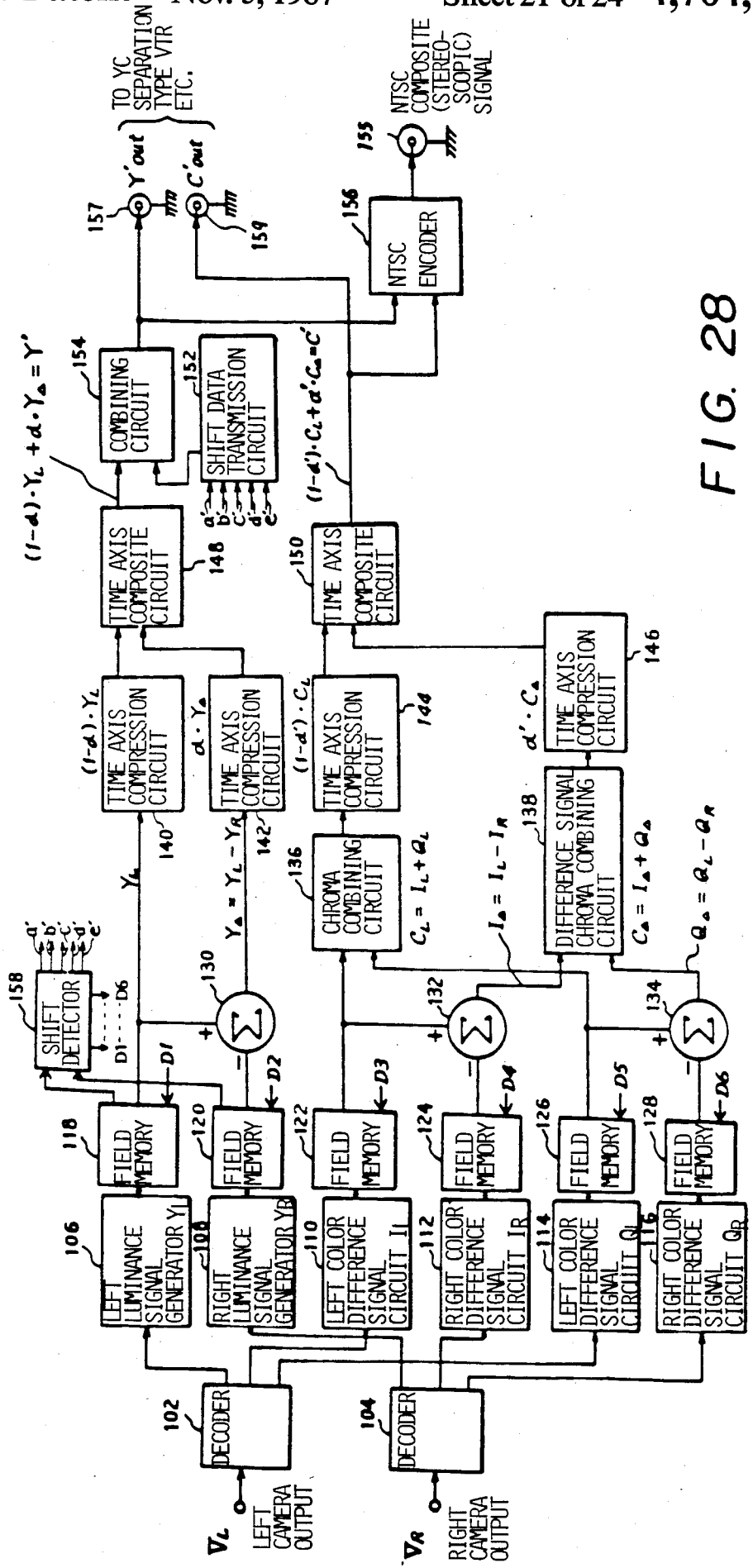
FIG. 28 is a block diagram showing an embodiment of an arrangement for detecting and transmitting a parallax difference in accordance with the present invention.

Next, a specific embodiment of a digital transmission system will be described. FIG. 28 is a block diagram showing a transmission encoder thereof. First, the camera outputs VL and VR derived from the left and right television cameras, respectively, are applied to decoders 102 and 104, respectively, so that a luminance component Y and chrominance components I and Q are separately obtained from the decoders 102 and 104. Next, left and right luminance signal generators 106 and 108 generate left and right luminance signals YL and YR, respectively. Left and right color signal circuits 110 and 112 generate left and right color difference signals IL and IR, respectively. Left and right color difference signal circuits 114 and 116 generate left and right color difference signals QL and QR, respectively.

As to the chrominance components I and Q, $C_W$ and $C_N$ in the high definition color television system, or R-Y and B-Y may be used. In order that these signals are processed and compressed time axis, a high frequency components of these signals are interrupted depending upon a bandwidth of a transmission system or a recording VTR. When a compression rate is $\alpha$, the pass band is expanded by $(1-\alpha)$ times. A value of $\alpha$ can be of the order of 0–0.1. A compression rate $\alpha'$ must be selected suitably for the color signals. Further, compression rate $\alpha$ for the luminance signal and the compression rate $\alpha'$ for the color signals can be selected to be equal to each other.

The signals derived from the signal generators 106–116 are temporarily stored in field memories 118–128.

Figure 31:
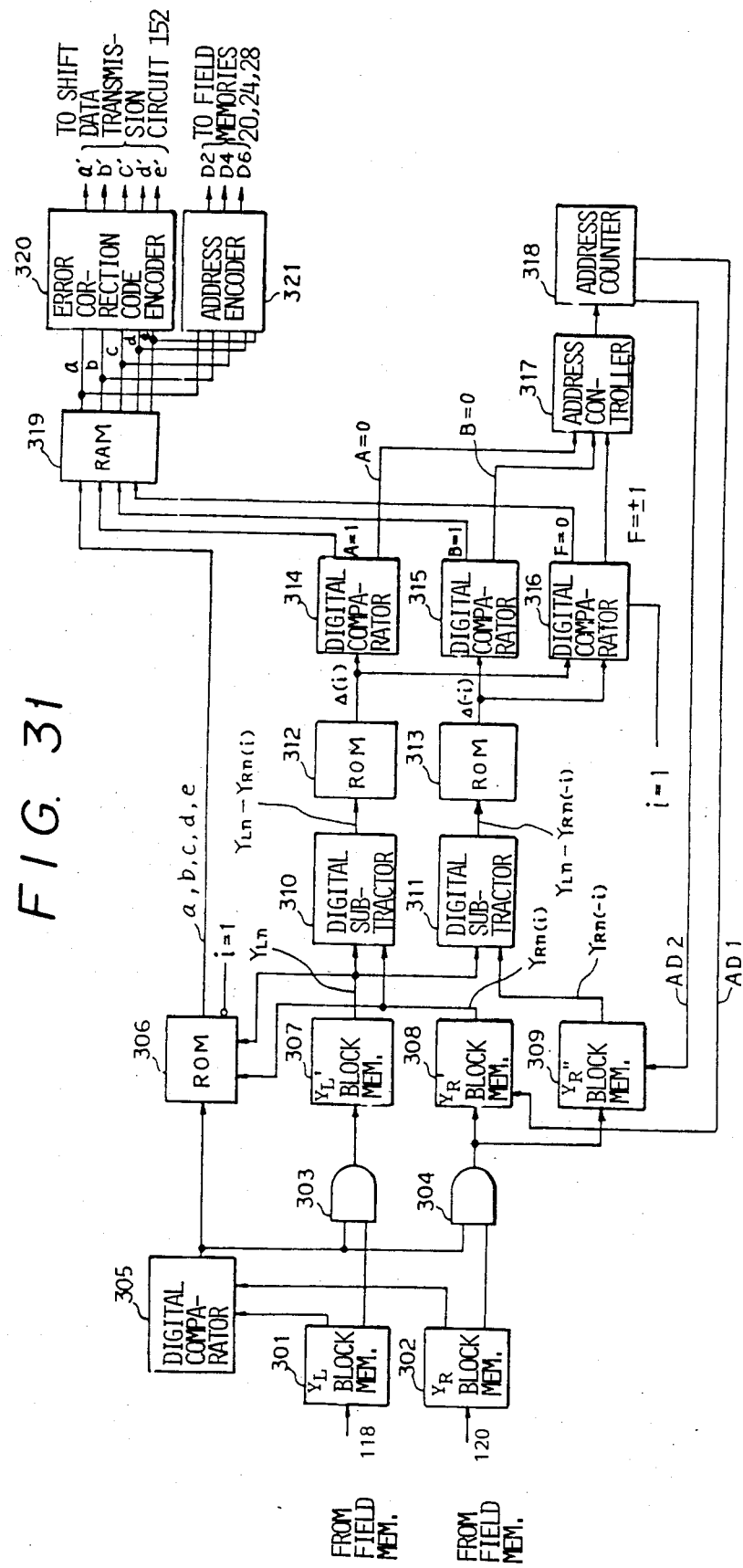
FIG. 31 is a block diagram showing an embodiment of the shift detector shown in FIG. 28.

The luminance signals derived from the field memories 118 and 120 are applied to a shift detector 158, in which a parallax shift between left and right images is detected for each block. An embodiment of a detailed arrangement of the shift detector 158 is shown in FIG. 31. The output signals D1–D6 from the shift detector 158 are applied to the field memories 118-128, respectively, so that one image is used as a reference while a position of a portion in the other image which is shifted by the detected parallax shift is shifted to read out signals from the field memories 118 and 120; 122 and 124; and 126 and 128. The signals thus read out are applied to analog arithmetic units 130, 132 and 134, respectively, so that the following outputs corresponding to the parallax are obtained:

$$Y\Delta = Y_L - Y_R$$

$$I\Delta = I_L - I_R$$

$$Q\Delta = Q_L - Q_R$$

The outputs from the shift detector 158 are used to detect a relative shift between the right and left images, and accordingly, in practice, only the outputs D2, D4 and D6 may be sufficiently used.

The outputs from the field memories 122 and 126 are supplied to a chroma combining circuit 138 so that $$C_L = I_L + Q_L$$

is obtained.

Further, the signals $I\Delta$ and $Q\Delta$ from the analog arithmetic units 132 and 134 are applied to a difference signal chroma combining circuit 138 to obtain $$C\Delta = I\Delta + Q\Delta.$$

The YL signal read out from the field memory 118, the output $Y\Delta$ derived from the analog arithmetic unit 130, the output $C_L$ derived from the chroma combining circuit 136 and the output $C_\Delta$ derived from a difference signal chroma composite circuit 138 are applied to time axis compression circuits 140, 142, 144 and 146, respectively, so that these signals are time-axis compressed at compression rates $(1-\alpha)$, $\alpha$, $(1-\alpha')$ and $\alpha'$, respectively.

That is, according to this embodiment of the present invention, the left video signal is used as a reference and the luminance signal $Y_L$ is compressed in time axis at the compression rate $(1-\alpha)$, while the chroma composite output $C_L$ obtained by combining the chrominance signals $I_L$ and $Q_L$ is subjected to the time axis compression at the compression rate $(1-\alpha')$. The luminance signal $Y_\Delta$ and the chrominance signal $C_\Delta$ of the parallax signal are also subjected to the time axis compression at the rates of $\alpha$ and $\alpha'$, respectively. It is of course possible that $\alpha=\alpha'$.

Figure 29:
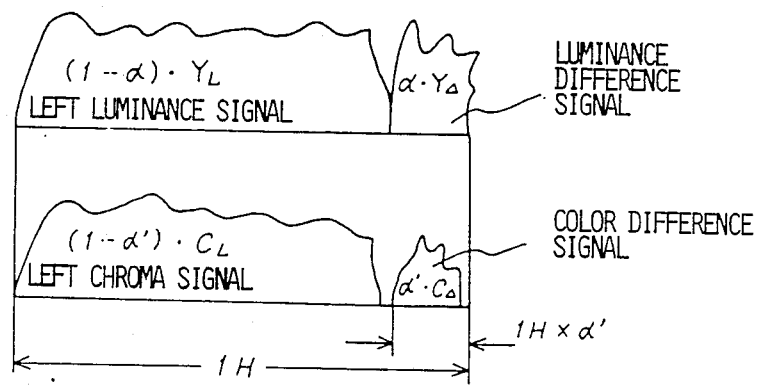
FIG. 29 is an explanatory diagram used to explain time-axis compression in the embodiment shown in FIG. 28.

FIG. 29 shows a mode of this time axis compression.

The luminance signals $(1-\alpha)\cdot Y_L$ and $\alpha\cdot Y_\Delta$ and the chroma signals $(1-\alpha')\cdot C_L$ and $\alpha'\cdot C_\Delta$ obtained by the time axis compression described above are combined on the time axes by time axis composite circuits 148 and 150, respectively.

From the time axis combining circuit 148, a luminance signal $$(1-\alpha)\cdot Y_L + \alpha\cdot Y_\Delta = Y'$$

is obtained. From the time axis combining circuit 150, a chroma output $$(1-\alpha')\cdot C_L + \alpha'\cdot C_\Delta = C'$$

is derived.

Referring back to FIG. 28, a shift data transmission circuit 152 receives error correction coded data a', b', c', d' and e' which are generated from the shift detector 158 in response to the data a, b, c, d and e and the error correction coded data are arranged within a predetermined 1H period in the vertical blanking period as shown in FIG. 27. The shift data output from the shift data transmission circuit 152 and the luminance signal Y' from the time axis combining circuit 148 are applied to a combining circuit 154 in which these outputs are combined. The combined signal is applied to an NTSC encoder 156 and an output terminal 157. A chroma output C' derived from the combining circuit 150 is applied to the NTSC encoder 156 and an output terminal 159. The NTSC composite signal is derived through an output terminal 155 from the NTSC encoder 156.

It should be noted that the NTSC encoder 156 may be replaced with an encoder of other television system such as a PAL encoder or a SECAM encoder, so that a PAL composite signal or a SECAM composite signal may be derived from the encoder.

The Y' output and the C' output derived, respectively, from the output terminals 157 and 159, in which the shift data is combined, can be directly applied to a YC separation type VTR such as $\beta$ cam or M type VTR.

When an encoder such as for NTSC system is used to process signals, it is possible to directly transmit them to a transmission line. Furthermore, the processed signals can be recorded in one-inch, $\frac{3}{4}$V, $\frac{1}{2}\beta$ or VHS VTR.

Figure 30:
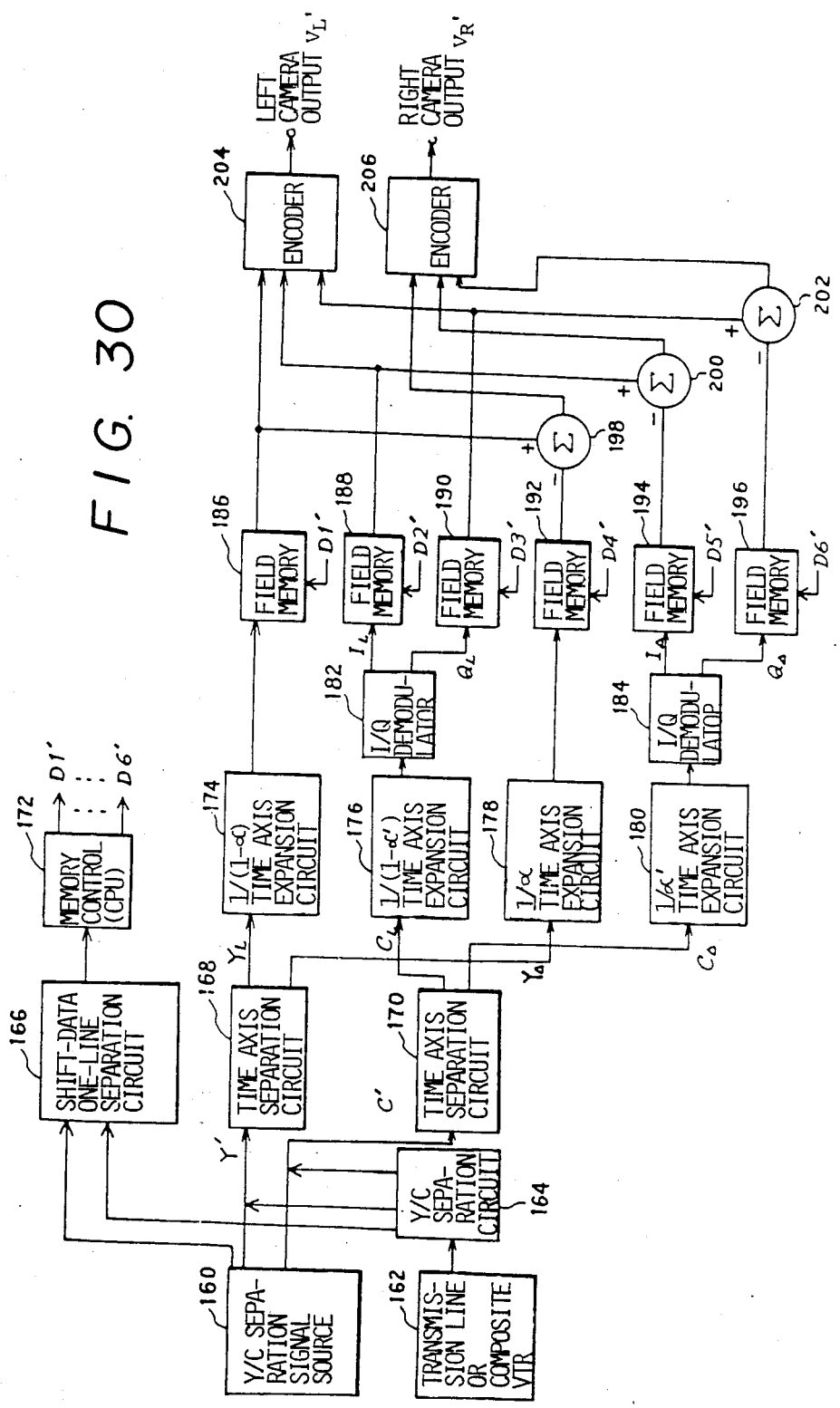
FIG. 30 is a block diagram showing an embodiment of a decoder for decoding a stereoscopic television signal in this embodiment.

FIG. 30 shows an embodiment of a decoder-demodulator which receives as an input signal not only a YC separated signal from a YC separated signal source 160 or a signal obtained from a VTR or the like but also a signal transmitted through a transmission line or derived from a composite VTR 162. In the case of the reception of the composite signal, the Y/C separation is effected by a Y/C separation circuit 164. These separated Y and C signals are a combination of an output from the left television camera and a parallax output. Thus, first, the time axis separation of the separated Y and C signals is effected in time axis separation circuits 168 and 170, so that signals $Y_L$ and $Y_\Delta$ and the signals $C_L$ and $C_\Delta$ are derived therefrom, respectively.

The signals YL and CL are applied to a $1/(1-\alpha)$ time axis expansion circuit 174 and a $1/(1-\alpha')$ time axis expansions circuit 176, respectively to effect time axis expansion at rates $1/(1-\alpha)$ and $1/1-\alpha')$, respectively. The parallax signals $Y^D$ and $C^D$ are applied to a $1/\alpha$ time axis expansion circuit 178 and a $1/\alpha'$ time axis expansion circuit 180, respectively, to effect time axis expansion at rates of $1/\alpha$ and $1/\alpha'$, respectively. The signals $C_L$ and $C_\Delta$ thus time-axis-expanded are applied to I/Q demodulators 182 and 184, respectively, so that I/Q demodulated signals $I_L$, $Q_L$, $I_\Delta$ and $Q_\Delta$ are derived.

The parallax signals $Y_\Delta$, $I_\Delta$ and $Q_\Delta$ whose time axes have been returned to their original time axes, and the reproduced signals $Y_L$, $I_L$ and $Q_L$ reproduced from the left camera are applied through field memories 186–196 to analog arithmetic units 198–202.

In the analog arithmetic unit 198, the output $Y_\Delta$ from the field memory 192 is subtracted from the output $Y_L$ from the field memory 186. In the analog arithmetic unit 200, the output $I_\Delta$ from the field memory 194 is subtracted from the output $I_L$ from the field memory 188. In the analog arithmetic unit 202, the output $Q_\Delta$ from the field memory 196 is subtracted from the output $Q_L$ from the field memory 190.

The respective outputs $Y_L$, $I_L$ and $Q_L$ from the field memories 186, 188 and 190 are applied to an encoder 204, so that a reproduced output $V_L'$ of the left camera is produced.

The respective outputs $Y_L-Y_\Delta$, $I_L-I_\Delta$ and $Q_L-Q_\Delta$ from the analog arithmetic units 198, 200 and 202 are applied to an encoder 206, so that a reproduced output $V_R'$ of the right camera is produced.

As to the parallax signal, a difference is obtained by shifting a signal by the parallax on the side of the transmitter, and accordingly on the side of the demodulator, after the parallax signal and the reproduced signal of the left camera have been processed, the position of these signals must be corrected according to the shift made on the side of the transmitter. Since the shift data is inserted into 1H in the vertical blanking period, the shift data can be extracted in the following manner. As shown in FIG. 30, the luminance signals derived from the signal source 160 and the Y/C separation circuit 164 are applied to a shift-data one-line separation circuit 166 and the separated data is stored in a memory in a memory CPU unit 172. Under the control of the CPU in the unit 172, shift data D1'–D6' for $Y_L$, $I_L$, $Q_L$, $Y_\Delta$, $I_\Delta$ and $Q_\Delta$ in each block determined based upon the view point distribution are applied to the field memories 186–196, respectively.

In response to these shift data, addresses of the field memories 186–196 are controlled so that the video signal of the right camera is derived. Thus, the encoders 204 and 206 deliver video outputs $V_L'$ and $V_R'$ of the left and right cameras, respectively.

In the embodiment described above, a buffer memory for arithmetic processing requires a memory capable of storing one field for each of the Y, I and Q signals (that is, three fields in total), but the ratio among the bandwidths required for the transmission of the Y, I and Q signals is about 2:1:1 at the most. Thus, if a memory capacity is distributed based on this ratio, it suffices that an overall memory capacity is two fields Referring next to FIG. 31, an embodiment of the shift detector 158 described above with reference to FIG. 28 will be described in more detail. Here, reference numerals 301 and 303 denote block memories, each of which derives sequentially luminance data for one block from entire luminance data for one field contained in the blocks B1–B16 or B1–B32 and read out from the field memories 118 and 120 and which stores the derived data therein. The following explanation will be made under the assumption that each block memory stores therein data for the n-th block.

The respective outputs from the block memories 301 and 302 are applied not only to AND gates 303 and 304 but also to a digital comparator 305. In the digital comparator 305, the outputs from the block memories 301 and 302 are compared with each other. When the left and right image data are different from each other so that the comparator 305 produces an output "1", it is deemed that there exists a parallax. When the comparator 305 produces an output "0", it is deemed that the left and right image data are from an object at a long distance and having no parallax. The output from the digital comparator 305 is applied to the AND gates 303 and 304. In the case of an object at a long distance having no parallax, i.e., the output from the comparator 305 is "0", the parallax shift detection is not made. Only when the output from the comparator 305 is "1", the data stored in the block memories 301 and 303 are transferred through the AND gates 303 and 304 to a block memory 307 and block memories 308 and 309, respectively.

The $Y_{Ln}$ data of the n-th block is read out from the block memory 307. The data $Y_{Rn(i)}$ obtained by shifting the n-th block rightward by i picture elements is read out from the block memory 308. The data $Y_{Rn(-i)}$ obtained by shifting the n-th block leftward by i picture elements is read out from the block memory 309.

In a digital subtractor 310, a subtraction between the outputs from the block memories 307 and 308 is carried out to obtain an output $(Y_{Ln} - Y_{Rn(i)})$. In a digital subtractor 311, a subtraction between the outputs from the block memories 307 and 309 is carried out to obtain an output $(Y_{Ln} - Y_{Rn(-i)})$. These subtraction outputs are stored in read only memories 312 and 313, respectively. The powers (square sums) of predetermined shift bits for the subtraction outputs; that is, the shift data are previously stored in the read only memories 312 and 313. As a consequence, by using the subtraction outputs derived from the subtractors 310 and 311 as addresses, powers $\Delta_{(i)}$ and $\Delta_{(-i)}$ of predetermined shift bits are read out from the read only memories 312 and 313, respectively. The outputs from the memories 312 and 313 are applied to digital comparators 314 and 315, respectively, and also both the outputs from the memories 312 and 313 are applied to a digital comparator 316.

In the digital comparator 314, $\Delta_{(i)}$ is compared with a predetermined threshold value $\alpha$ which interrupts the calculation of shift data, so that a comparison output $A=1$ is derived therefrom when $\Delta_{(i)} \leq \alpha$ and a comparison output $A=0$ is derived when $\Delta_{(i)} > \alpha$. In like manner, in the digital comparator 315, $\Delta_{(-i)}$ is compared with the threshold value $\alpha$, in such a way that a comparison output $B=1$ is derived when $\Delta_{(-i)} \leq \alpha$ and a comparison output $B=0$ is derived when $\Delta_{(-i)} > \alpha$. The digital comparator 316 is driven into an enable state when $i=1$; that is, when the block memories 301 and 302 are set. Only in the first loop, the direction of shift is compared and a comparison output $F=1$ is derived when $\Delta_{(i)} - \Delta_{(-i)} > 0$, while a comparison output $F=-1$ is obtained when $\Delta_{(i)} - \Delta_{(-i)} < 0$, and a comparison output $F=0$ is derived when $\Delta_{(i)} = \Delta_{(-i)}$.

Stored in the read only memory 306 are values of lengths a, b, c, d and e of a parallax object previously calculated for shift data from the digital subtractors 310 and 311. As a result, only when the comparison output from the digital comparator 305 is "1", the read only memory 306 is enabled for readout. Only when $i=1$, the predetermined data a, b, c, d and e are read out by using the data derived from the memory 307 and 308 as addresses and the read out data are applied to a random access memory 319.

The outputs $A=1$, $B=1$ and $F=0$ from the digital comparators 314, 315 and 316 are applied to the random access memory 319, respectively. When $\Delta_{(i)}$ and $\Delta_{(-i)}$ are smaller than $\alpha$ so that $A=1$ and $B=1$, the value of i is stored as b in the memory 319. In this manner, the parallax data a, b, c, d, and e are stored in the memory 319. These data a, b, c, d and e are read out from the memory 319 to be applied to an error correction code encoder 320, in which the read out data are converted into a desired error correction codes a', b', c', d' and e', which in turn are transferred to the data transmission circuit 152.

An address encoder 321 may be in the form of a read only memory in which are stored the shift detection data corresponding to the data a through e from the random access memory 319. It is assumed that only D2, D4 and D6 be stored in the memory 321 for the sake of simplicity. In response to the above-described shift data a through e, readout address positions in each of the field memories 118–128 are modified in accordance with the detection data D1–D6.

Referring still to FIG. 31, the output data $A=0$, $B=0$ and $F=+1$ or $-1$ from the digital comparators 314, 315 and 316 are applied to an address controller 317 which may be in the form of a read only memory or an encoder. When $F=1$ and $A=0$, $(-i)$ is changed to $(-i)-1$ so that only the second address signal AD2 is changed. When $F=-1$ and $B=0$, (i) is changed to $(i)+1$ so that only the first address signal AD1 is changed. In response to the first and second address signals AD1 and AD2, the n-th block is shifted rightward and leftward by i picture elements.

As described above, in the shift detector 158 shown in FIG. 31, the difference between the left and right luminance signals YL and YR is obtained and also it is detected whether the shift is in the right or left direction, so that readout addresses of the field memories 120, 122 and 124 are modified in accordance with the detected data D2, D4 and D6 in a manner that an amount of the shift is minimized. Further, the control for changing the first and second address signals AD1 and AD2 is repeated until an amount of the shift $\Delta_{(i)}$ or $\Delta_{(-i)}$ becomes less than the threshold value $\alpha$. When the shift $\Delta_{(i)}$ or $\Delta_{(-i)}$ becomes less than the threshold value $\alpha$, the shift data a through e are derived from the memory 319. The shift data thus derived are converted into the error correction codes a' through e' by the encoder 320 and also the detection signals D1–D6 are derived from the encoder 321.

Further, a circuit for changing the size of parallax shift blocks between the periphery of the image and the center portion thereof can be arranged with the circuits as shown in FIGS. 9A and 9B. In this case, when the central processing unit 23 produces a block data (N, M), it is sufficient that N and M are changed in accordance with dimensions of the blocks as shown in FIGS. 24 and 25, instead of changing N and M by L and K, respectively. To this end, it is sufficient that data representative of the dimensions of the blocks; that is, variable K and L data are stored in the read only memory 23A shown in FIG. 9A.

POSSIBLE APPLICATIONS IN THE INDUSTRY

According to the present invention, in order to transmit a stereoscopic television signal, for which a conventional system requires a broad transmission bandwidth for two picture frames, the transmission band can be considerably reduced and in the case of a high definition television system, it becomes possible to transmit a stereoscopic television signal by adding merely some extra information to the high definition television system. For instance, in the case of a stereoscopic television system based upon the high definition television system, the number of the total sample points is 1125 (lines)×1440 (picture elements)×3 (R, G and B signals)=4,860,000 per frame. In contrast, the number of shift information is about 0.2% (10,000÷4,860,000) at the most when each frame is divided into 100×100 blocks. Therefore, the difference signal can be reduced less than 1/10 according to its nature. As a result, a required transmission capacity as a whole is increased by only 10% in the case of the high definition television system. In addition, in accordance with the present invention, not only the transmission capacity can be reduced but also a vertical positional error between the right and left pictures caused by manipulation of the right and left television cameras can be automatically corrected by replacing the vertical component of each shift vector with zero when the vertical component is regarded to be substantially constant. As a consequence, one of factors causing the fatigue when both eyes are used to view an object can be eliminated.

Furthermore, according to the present invention, visual characteristics of a human being is utilized to detect a parallax of an object only when the object is at a short distance from the television cameras, which is usually located in the center portion of the picture. As a result, a television signal for left and light channels can be transmitted through one channel.

As is clear from the above-described explanation, the present invention is equally applicable to an analog system and has an advantage that an existing video transmission system or VTR can be utilized as it is by employing the same signal format as a conventional composite video signal when the present invention is applied to the analog system.

Moreover, it is to be understood that the present invention is not limited to a color stereoscopic television system and may be equally applied to a monochrome stereoscopic television system.

We claim:

1. A system for transmitting a stereoscopic television picture signal comprising:
   means for dividing a first image and a second image of one frame of a stereoscopic television picture into a plurality of blocks;
   means for shifting a position of one of said images to obtain an amount of a positional shift between said first and second images so that a difference between one picture signal of one of said first and second images for each block and the other picture signal of the other of said first and second images for a block located at a position corresponding to said each block on said picture;
   means for shifting said one picture signal by said positional shift to produce a shift picture signal;
   means for obtaining a difference signal between said shift picture signal and said other picture signal;
   means for compressing data of said difference signal; and
   means for transmitting said data compressed difference signal, said one picture signal and a signal representative of said amount of said positional shift.

2. A stereoscopic television picture signal transmission system as claimed in claim 1, wherein said first and second images are left and right images of a stereoscopic picture.

3. A stereoscopic television picture signal transmission system as claimed in claim 1, wherein a stereoscopic picture is composed of a plurality of images and sequentially adjacent images of said plurality of images are designated as said first and second images.

4. A stereoscopic television picture signal transmission system as claimed in claim 1, wherein a stereoscopic picture is composed of a plurality of images and a predetermined image of said plurality of images and one of the remaining images are designated as said first and second images.

5. A stereoscopic television picture signal transmission system as claimed in claim 1, wherein said one picture signal and said difference signal are compressed in time axis and combined within one horizontal scanning period and said parallax shift data is multiplexed in a vertical blanking period to transmit said one picture signal, said difference signal and said parallax shift signal in a signal bandwidth of one television channel.

6. A stereoscopic television picture signal transmission system as claimed in claim 5, wherein a size of division into said blocks is made in inverse proportion to a view point distribution.

7. A stereoscopic television picture signal transmission system as claimed in claim 1, further comprising a first frame memory and a second frame memory for alternately storing said one picture signal at a unit of frame in each of said first and second frame memories;
   a third frame memory and a fourth frame memory for alternately storing said other picture signal at a unit of frame in each of said third and fourth frame memories;
   means for designating an address (N,M) representative of a predetermined line position N and a position M of a picture element on said predetermined line in each of said blocks of said one picture signal;
   an address counter for generating address signals i and j;
   stack means for storing therein a plurality of shift vector candidates (p,q);
   means responsive to said N,i and p to produce line addresses (N+i+p) and (N+i) in said block;
   means responsive to said M, j and q to produce picture element addresses (M+j+q) and (M+j);
   means for obtaining as said difference signal a difference between data read out from said first or second frame memory in response to said addresses (N+i+p) and (M+j+q) and data read out from said third or fourth frame memory in response to said addresses (N+i) and (M+j);
means for obtaining an absolute value of said difference thus obtained;
means for obtaining a total sum of the absolute values of the differences in said block;
means for comparing said total sum at sequential addresses; and
means responsive to the result of the comparison of said total sum for storing a value of (p,q) when a smaller total sum is obtained and for deriving as said positional shift a value of (p,q) when the minimum value of said total sum is obtained 8. A stereoscopic television picture signal transmission system as claimed in claim 7, wherein said first and second images are left and right images of stereoscopic picture.

9. A stereoscopic television picture signal transmission system as claimed in claim 7, wherein a stereoscopic picture is composed of a plurality of images and sequentially adjacent images of said plurality of images are designated as said first and second images.

10. A stereoscopic television picture signal transmission system as claimed in claim 7, wherein a stereoscopic picture is composed of a plurality of images and a predetermined image of said plurality of images and one of the remaining images are designated as said first and second images.

11. A stereoscopic television picture signal transmission system as claimed in claim 1, wherein shift states of said first and second images are determined at a plurality of corresponding positions of said first and second images of said one frame, and in response to the result of the determination thus made, said first and second images are shifted so that the difference signal is produced and said positional shift is determined in each block.

12. A stereoscopic television picture signal transmission system as claimed in claim 11, wherein said first and second images are left and right images of a stereoscopic picture.

13. A stereoscopic television picture signal transmission system as claimed in claim 11, wherein a stereoscopic picture is composed of a plurality of images and sequentially adjacent images of said plurality of images are designated as said first and second images.

14. A stereoscopic television picture signal transmission system as claimed in claim 11, wherein a stereoscopic picture is composed of a plurality of images and a predetermined image of said plurality of images and one of the remaining images are designated as said first and second images.

15. A system for transmitting a stereoscopic television picture signal transmission system comprising:
means for dividing a portion in a periphery of each of left and right images of a stereoscopic television picture into relatively large-sized blocks and for dividing a portion in the center of each of said left and right images into relatively small-sized blocks;
means for detecting a parallax shift between an image of a block of one of said left and right images and an image of a block of the other image corresponding to said block of said one image, to obtain a parallax shift data;
means for shifting a parallax shift portion in said block of said one image in accordance with said parallax shift data, to generate a shift picture signal;
means for obtaining a difference signal between said shift picture signal and said other picture signal in a block of said other image corresponding to a block of said one image; and
means for transmitting said one picture signal, said parallax shift signal and said difference signal in said block for each of said blocks.

16. A stereoscopic television picture signal transmission system as claimed in claim 15, wherein a size of division into said blocks is made in inverse proportion to a view point distribution.

17. A receiver for a system for transmitting a stereoscopic television picture signal having:
means for dividing a first image and a second image of one frame of a stereoscopic television picture into a plurality of blocks;
means for shifting a position of one of said images to obtain an amount of a positional shift between said first and second images so that a difference between one picture signal of one of said first and second images for each block and the other picture signal of the other of said first and second images for a block located at a position corresponding to said each block on said picture;
means for shifting said one picture signal by said positional shift to produce a shift picture signal;
means for obtaining a difference signal between said shift picture signal and said other picture signal;
means for compressing data of said difference signal; and
means for transmitting said data compressed difference signal, said one picture signal and a signal representative of said amount of said positional shift;
said receiver comprising:
means for receiving and separating said compressed difference signal; said one picture signal and said signal representative of the amount of the positional shift from each other;
means for decoding a difference signal from the compressed difference signal thus separated;
means for shifting one picture signal thus separated in response to the separated signal representative of the amount of the positional shift;
means for obtaining an addition signal of said one picture signal thus shifted and the decoded difference signal; and
means for making said one picture signal thus separated as one reproduced picture signal and making said summation signal as other reproduced picture signal.

18. A receiver as claimed in claim 17, further comprising:
a fifth frame memory for storing therein said separated one picture signal;
means for delaying said separated difference signal by one frame;
means for designating an address (N,M) for indicating a predetermined line position N and a position M of a picture element on said predetermined line in each block of said one picture signal;
an address counter for generating address signals i and j;
means responsive to said N, i and p to produce line addresses (N+i+p) and (N+i) in said block;
means responsive to said M, j and q to produce picture element addresses (M+j+q) and (M+j) within said block;
means for producing an address (N+i+p, M+j+q) from said separated signal (p,q) representative of the amount of the positional shift and said (N,M) and (i,j);

means for deriving as a picture signal of said first image data read out from said fifth frame memory in response to said addresses (N+i+p) and (M+j+p);

means for adding said read out data to a difference signal delayed by one frame;

a sixth frame memory for storing therein an addition output from said adding means; and means for deriving as a picture signal of said second image data read out from said sixth frame memory in response to said addresses (N+i) and (M+j).

* * * * *